(12) United States Patent
Kho et al.

(10) Patent No.: US 12,094,445 B2
(45) Date of Patent: *Sep. 17, 2024

(54) VIBRATION GENERATING DEVICE AND DISPLAY APPARATUS INCLUDING THE SAME

(71) Applicant: LG Display Co., Ltd., Seoul (KR)

(72) Inventors: Yuseon Kho, Paju-si (KR); Yong-Su Ham, Paju-si (KR); YongWoo Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/451,368

(22) Filed: Aug. 17, 2023

(65) Prior Publication Data

US 2023/0395054 A1    Dec. 7, 2023

Related U.S. Application Data

(63) Continuation of application No. 17/218,620, filed on Mar. 31, 2021, now Pat. No. 11,776,519.

(30) Foreign Application Priority Data

Mar. 31, 2020    (KR) .................. 10-2020-0039505

(51) Int. Cl.
*G06F 3/16*    (2006.01)
*G06F 1/16*    (2006.01)
(Continued)

(52) U.S. Cl.
CPC .......... *G10K 9/122* (2013.01); *G06F 1/1605* (2013.01); *G06F 3/16* (2013.01)

(58) Field of Classification Search
CPC . A61B 5/00; A61B 8/00; G10K 9/122; G10K 9/125; G10K 9/128; G06F 1/16;
(Continued)

(56) References Cited

U.S. PATENT DOCUMENTS 8,953,823 B2    2/2015    Fujise et al.
2007/0103449 A1   5/2007    Laitinen et al.
(Continued)

FOREIGN PATENT DOCUMENTS

CN    110930905 A    3/2020
JP    2009-515351 A    4/2009
(Continued)

OTHER PUBLICATIONS

Japanese Office Action dated Nov. 7, 2022, issued in corresponding Japanese Patent Application No. 2021-061915.
(Continued)

*Primary Examiner* — Chanh D Nguyen
*Assistant Examiner* — Nguyen H Truong
(74) *Attorney, Agent, or Firm* — Morgan, Lewis & Bockius LLP

(57) ABSTRACT

A display apparatus includes a display panel displaying an image and a vibration generating device disposed on a rear surface of the display panel to vibrate the display panel. The vibration generating device includes a piezoelectric structure including a first region and a second region, the first region has a vibration characteristic of a first frequency, and the second region has a vibration characteristic of a second frequency which differs from the first frequency.

41 Claims, 10 Drawing Sheets

(51) Int. Cl.
*G06V 40/12* (2022.01)
*G10K 9/122* (2006.01)

(58) Field of Classification Search
CPC .......... G06F 1/1605; G06F 21/32; G06F 3/01;
G06F 3/043; G06F 3/16; G06V 40/13;
G06K 9/00; G06K 9/20; G06K 9/38;
G06K 9/46; H04R 17/00; H04R 17/02;
H04R 1/02; H04R 1/26; H04R 1/28;
H04R 5/02; H04R 31/00; H04R 9/06;
H04R 11/02; H01L 41/047; H01L 41/08;
H01L 41/083; H01L 41/09; H01L 41/113;
H01L 31/12; H01L 31/105; H01L 27/12;
H01L 27/32; H01L 51/00; H01L 51/52
See application file for complete search history.

(56) References Cited

U.S. PATENT DOCUMENTS

| | | | |
|---|---|---|---|
| 2009/0154735 | A1 | 6/2009 | Kim et al. |
| 2010/0256499 | A1 | 10/2010 | Imahashi |
| 2011/0215677 | A1 | 9/2011 | Jiang et al. |
| 2012/0140969 | A1 | 6/2012 | Fujise et al. |
| 2012/0279865 | A1* | 11/2012 | Regniere ................. C23C 18/54 |
| | | | 205/125 |
| 2013/0243224 | A1 | 9/2013 | Onishi et al. |
| 2014/0180103 | A1 | 6/2014 | Sinelnikov |
| 2015/0341714 | A1 | 11/2015 | Ahn et al. |
| 2018/0288202 | A1 | 10/2018 | Park et al. |
| 2019/0028669 | A1 | 1/2019 | Shin et al. |
| 2020/0059733 | A1 | 2/2020 | Shin et al. |
| 2020/0092650 | A1 | 3/2020 | Ham et al. |
| 2020/0097244 | A1 | 3/2020 | Kim et al. |
| 2020/0293084 | A1 | 9/2020 | Ahn et al. |
| 2021/0073511 | A1 | 3/2021 | Buchan et al. |
| 2021/0124423 | A1 | 4/2021 | Fan et al. |
| 2021/0263554 | A1 | 8/2021 | Park et al. |
| 2021/0406500 | A1 | 12/2021 | Bu |
| 2022/0114828 | A1 | 4/2022 | Kim et al. |
| 2022/0114829 | A1* | 4/2022 | Cui ........................ G06F 1/1637 |
| 2023/0076265 | A1* | 3/2023 | Peters .................... H10N 30/08 |

FOREIGN PATENT DOCUMENTS

| | | |
|---|---|---|
| JP | 2012-134956 A | 7/2012 |
| JP | 2017-011554 A | 1/2017 |
| JP | 2018-066620 A | 4/2018 |
| JP | 2018-068620 A | 5/2018 |
| JP | 2018-536359 A | 12/2018 |
| JP | 2020-048194 A | 3/2020 |
| KR | 20190056621 A | 5/2019 |
| WO | 2012/060041 A1 | 5/2012 |
| WO | 2016/017632 A1 | 2/2016 |

OTHER PUBLICATIONS

European Search Report dated Jul. 30, 2021 issued in corresponding International Patent Application No. 21166384.4.
Japanese Office Action dated Apr. 15, 2022, issued in corresponding Japanese Patent Application No. 2021-061915 Note: US 2020/0059733 cited therein is already of record.
Office Action dated Jul. 27, 2022 issued in corresponding Chinese Patent Application No. 202110348828.6.
Office Action issued in corresponding Japanese Patent Application No. 2023-032485, dated Mar. 4, 2024. (Note: JP 2017-011554 A, US 2020/0059733 A1 and JP 2012-134956 A were previously cited).

* cited by examiner

VIBRATION GENERATING DEVICE AND DISPLAY APPARATUS INCLUDING THE SAME

CROSS-REFERENCE TO RELATED APPLICATIONS

This application is a continuation of application Ser. No. 17/218,620, filed on Mar. 31, 2021, which claims the benefit of and priority to the Korean Patent Application No. 10-2020-0039505 filed on Mar. 31, 2020, the entirety of each of which is hereby incorporated by reference.

TECHNICAL FIELD

The present disclosure relates to a vibration generating device for implementing a multifunction and a display apparatus including the vibration generating device.

DISCUSSION OF THE RELATED ART

Recently, as the degree of integration of electronic devices increases and high-level technologies are developed, various functions are installed in electronic devices.

For example, various functions such as a display function, an image sensing function, a haptic function, and a sound output function may be installed in portable electronic devices (for example, portable phones) including a display device, and piezoelectric elements may be used for an image sensing function, a haptic function, and a sound output function.

In the related art, because a device for performing each function is independently equipped in electronic devices, it is very difficult to miniaturize and slim electronic devices.

For example, display devices display an image by using a display panel, and a separate speaker should be installed in display devices so as to provide a sound. In a case where a speaker is provided in display devices, the speaker occupies a certain space, and due to this, there is a limitation in the design and spatial arrangement of the display devices.

A speaker applied to display apparatuses may be, for example, an actuator including a magnet and a coil. However, when an actuator is applied to a display apparatus, a thickness thereof is thickened. Therefore, piezoelectric elements for realizing a thin thickness are attracting much attention.

Because piezoelectric elements have a fragile characteristic, the piezoelectric elements are easily damaged due to an external impact, and due to this, have a problem where reliability is low in sound reproduction. Therefore, the need for piezoelectric elements having a new structure for performing various functions, implementing a thin film structure, and preventing stress and damage caused by an impact and a self-vibration is increasing.

SUMMARY

Accordingly, embodiments of the present disclosure are directed to provide a vibration generating device and a display apparatus including the same that substantially obviate one or more problems due to limitations and disadvantages of the related art.

An aspect of the present disclosure is to provide a vibration generating device for performing various functions such as a haptic function, a speaker function, a receiver function, and an image sensing function and a display apparatus including the vibration generating device.

Another aspect of the present disclosure is to provide a vibration generating device, which implements a multifunction, has excellent flexibility, and is implemented as an ultra-thin film type, and a display apparatus including the vibration generating device.

Additional features and aspects will be set forth in part in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described herein, a vibration generating device comprises a piezoelectric structure including a first region and a second region, wherein the first region has a vibration characteristic of a first frequency, and the second region has a vibration characteristic of a second frequency which differs from the first frequency.

In another aspect, a vibration generating device comprises a first region having a first vibration characteristic and configured to operate in a first vibration mode and a second region having a second vibration characteristic and configured to operate in a second vibration mode, wherein the first region and the second region include insulating materials having different Young's modulus.

In another aspect, a display apparatus comprises a display panel displaying an image and a vibration generating device disposed on a rear surface of the display panel to vibrate the display panel, wherein the vibration generating device includes a piezoelectric structure including a first region and a second region parallel to each other, and/or the first region has a vibration characteristic of a first frequency, and the second region has a vibration characteristic of a second frequency which differs from the first frequency.

In another aspect, a display apparatus comprises a display panel displaying an image and a vibration generating device disposed on a rear surface of the display panel to vibrate the display panel, wherein the vibration generating device includes a first region having a first vibration characteristic and operating in a first vibration mode and a second region having a second vibration characteristic and operating in a second vibration mode, and the first region and the second region include insulating materials having different Young's modulus.

In another aspect, an apparatus comprises a vibration plate and a vibration generating device disposed on a rear surface of the vibration plate to vibrate the vibration plate, wherein the vibration generating device includes a piezoelectric structure including a first region and a second region, the first region has a vibration characteristic of a first frequency, and the second region has a vibration characteristic of a second frequency which differs from the first frequency.

In another aspect, an apparatus comprises a vibration plate and a vibration generating device disposed on a rear surface of vibration plate to vibrate the vibration plate, wherein the vibration generating device includes a first region having a first vibration characteristic and operating in a first vibration mode and a second region having a second vibration characteristic and operating in a second vibration mode, and the first region and the second region include insulating materials having different Young's modulus.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are exemplary and explanatory, and are intended to provide further explanation of the disclosures as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles of the disclosure.

Figure 1:
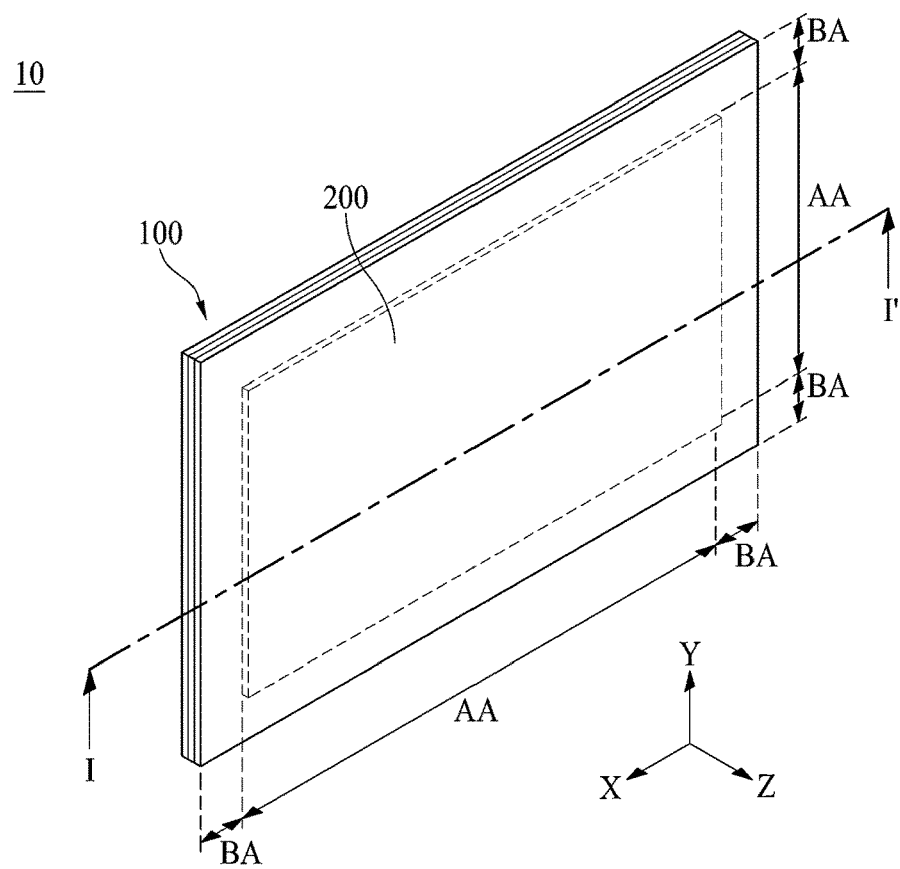
FIG. 1 illustrates a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details Like reference numerals refer to like elements throughout. In the following description, when the detailed description of the relevant known function or configuration is determined to unnecessarily obscure the important point of the present disclosure, the detailed description will be omitted.

In a case where "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case which is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, the terms "first," "second," "A," "B," "(a)," "(b)," etc., may be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed" between the elements or layers, unless otherwise specified.

The term "at least one" should be understood as including any and all combinations of one or more of the associated listed elements. For example, the meaning of "at least one of a first element, a second element, and a third element" denotes the combination of all elements proposed from two or more of the first element, the second element, and the third element as well as the first element, the second element, or the third element.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic device such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set device which is a final consumer device or an application product including the LCM or the OLED module.

In some embodiments, an LCM or an OLED module including a display panel and a driver may be referred to as a narrow-sense display apparatus, and an electronic apparatus which is a final product including an LCM or an OLED module may be referred to as a set apparatus. For example, the narrow-sense display apparatus may include a display panel, such as an LCD or an OLED, and a source printed circuit board (PCB) which is a controller for driving the display panel. The set device may further include a set PCB which is a set controller electrically connected to the source PCB to overall control the set apparatus.

A display panel applied to an embodiment of the present disclosure may use all types of display panels such as a liquid crystal display panel, an organic light emitting diode (OLED) display panel, and an electroluminescent display panel, but embodiments are not limited to a specific display panel which is vibrated by a vibration generating device according to an embodiment of the present disclosure to output a sound. Also, a shape or a size of a display panel applied to a display apparatus according to an embodiment of the present disclosure is not limited.

For example, if the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

The display panel may further include a backing such as a metal plate attached on the display panel. However, embodiments are not limited to the metal plate, and the display panel may include another structure.

In the present disclosure, the display panel may be applied to vehicles as a user interface module such as a central control panel for automobiles. For example, the display panel may be provided between occupants sitting on two front seats in order for a vibration of the display panel to be transferred to the inside of a vehicle. Therefore, an audio experience in a vehicle is improved in comparison with a case where speakers are disposed on interior sides of the vehicle.

Hereinafter, embodiments of the present disclosure will be described in detail with reference to the accompanying drawings. In adding reference numerals to elements of each of the drawings, although the same elements are illustrated in other drawings, like reference numerals may refer to like elements. Also, for convenience of description, a scale of each of elements illustrated in the accompanying drawings differs from a real scale, and thus, is not limited to a scale illustrated in the drawings.

Hereinafter, a vibration generating device and a display apparatus including the same according to some embodiments of the present disclosure will be described in detail with reference to the accompanying drawings.

Figure 2:
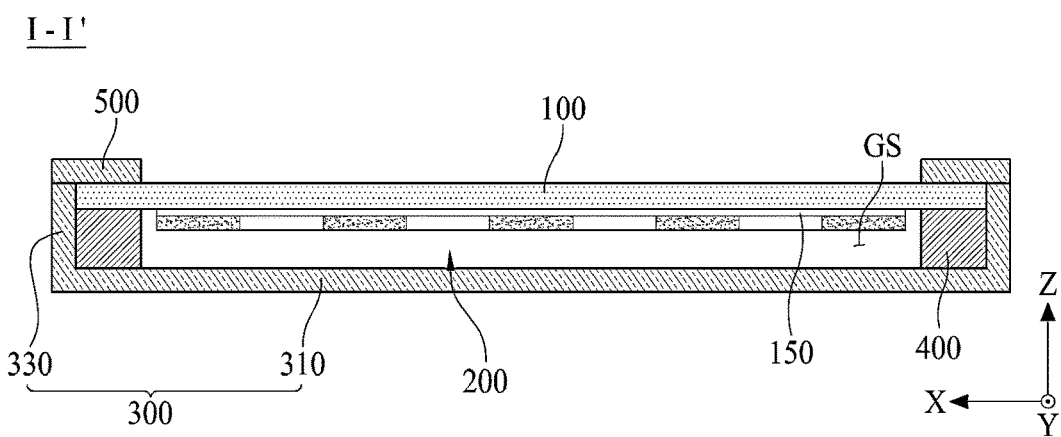
FIG. 2 is a cross-sectional view taken along line I-I' illustrated in FIG. 1.

FIG. 1 illustrates a display apparatus 10 according to an embodiment of the present disclosure. FIG. 2 is a cross-sectional view taken along line I-I' illustrated in FIG. 1.

With reference to FIGS. 1 and 2, the display apparatus 10 according to an embodiment of the present disclosure may include a display panel 100 and a vibration generating device 200 disposed on a rear surface (or a backside surface) of the display panel 100.

The display panel 100 may display an image (for example, an electronic image or a digital image). For example, the display panel 100 may output light to display an image.

According to an embodiment of the present disclosure, the display panel 100 may be a curved display panel or one of all types of display panels such as a liquid crystal display panel, an organic light emitting display panel, a micro light emitting diode display panel, an electroluminescent display panel, and an electro-wetting display panel, but embodiments are not limited thereto. According to another embodiment of the present disclosure, the display panel 100 may be a flexible display panel. For example, the display panel 100 may be a flexible liquid crystal display panel, a flexible organic light emitting display panel, a flexible micro light emitting diode display panel, a flexible electroluminescent display panel, or a flexible electro-wetting display panel, but embodiments are not limited thereto. According to another embodiment of the present disclosure, the display panel 100 may be a display panel with integrated touch panel. For example, the display panel with integrated touch panel may include a touch panel attached on a display panel, or may include a touch electrode layer disposed in the display panel.

The display panel 100 according to an embodiment of the present disclosure may include a display area AA, which displays an image based on driving of a plurality of pixels arranged on a substrate, and a non-display area BA which surrounds the display area. For example, the display panel 100 may be implemented so that a total front surface of the substrate is implemented as the display area without the non-display area, based on a non-bezel structure. For example, the display panel 100 may be a transparent display panel which includes a light transmission portion disposed in at least one of the plurality of pixels.

For example, the display panel 100 may display an image in a type such as a top emission type, a bottom emission type, or a dual emission type, based on a structure of a pixel array layer including an anode electrode, a cathode electrode, and a light emitting device layer. In the top emission type, visible light emitted from the pixel array layer may be irradiated onto a forward region in front of a base substrate to allow an image to be displayed, and in the bottom emission type, the visible light emitted from the pixel array layer may be irradiated onto a rearward region behind the base substrate to allow an image to be displayed.

For example, the light emitting device layer may include a micro light emitting diode device which is electrically connected to each of the anode electrode and the cathode electrode. The micro light emitting diode device may be a light emitting diode implemented as an integrated circuit (IC) type or a chip type and may include a first terminal electrically connected to the anode electrode and a second terminal electrically connected to the cathode electrode. The cathode electrode may be connected to a light emitting device of the light emitting device layer provided in each pixel area in common.

The display panel 100 according to an embodiment of the present disclosure may include a bending portion which is bent or curved to have a curved shape or a certain curvature radius.

The bending portion of the display panel 100 may be implemented in at least one of one edge and the other edge of the display panel 100 which are parallel to each other. The one edge and/or the other edge, where the bending portion is implemented, of the display panel 100 may include only the non-display area BA, or may include an edge of the display area AA and the non-display area BA. For example, the display panel 100 including the bending portion provided by bending of the non-display area BA may have a structure where a one-side bezel bending structure or a both-side bezel bending structure. Also, the display panel 100 including the edge of the display area AA and the bending portion provided by bending of the non-display area BA may have a structure where a one-side active bending structure or a both-side active bending structure.

The display apparatus 10 according to an embodiment of the present disclosure may further include a supporting member 300 disposed on a rear surface of the display panel 100 and a panel connection member 400 disposed between the display panel 100 and the supporting member 300.

The supporting member 300 may be referred to as the other term such as a cover bottom, a plate bottom, a back cover, a base frame, a metal frame, a metal chassis, a chassis base, or an m-chassis. Therefore, the supporting member 300 may be implemented as an arbitrary type frame or a plate structure, which is disposed on the rear surface of the display apparatus 10. The supporting member 300 may be a rear structure.

The supporting member 300 may cover the rear surface of the display panel 100. For example, the supporting member 300 may cover the whole rear surface of the display panel 100 with a gap space GS therebetween. For example, the supporting member 300 may include at least one of a glass material, a metal material, and a plastic material. For example, the supporting member 300 including the glass material may be sapphire glass. For example, the supporting member 300 including the metal material may include one of aluminum (Al), an Al alloy, a magnesium (Mg) alloy, and an iron (Fe)-nickel (Ni) alloy.

The supporting member 300 according to an embodiment of the present disclosure may additionally cover a side surface of the display panel 100. For example, the supporting member 300 may include a rear surface portion 310 which covers the rear surface of the display panel 100 with the gap space GS therebetween and a side surface portion 330 which is connected to an end of the rear surface portion 310 and covers the side surface of the display panel 100. However, an embodiment of the present disclosure is not limited thereto, and the supporting member 300 may be a single-body structure where the rear surface portion 310 and the side surface portion 330 are provided as one body.

The side surface portion 330 may be implemented as a separate middle frame connected to the supporting member 300. In this case, the side surface portion 330 implemented as the middle frame may cover the supporting member 300, and for example, may cover one or more of a side surface of the rear surface portion 310 and the side surface of the display panel 100. For example, the side surface portion 330 implemented as the middle frame may include a material which is the same as or different from that of the supporting member 300.

The panel connection member 400 according to an embodiment of the present disclosure may be disposed between a periphery (or an edge) of a rear surface of the display panel 100 and a periphery (or an edge) of a front surface of the supporting member 300. The supporting member 300 may be disposed at the periphery of the rear surface of the display panel 100 by using the panel connection member 400. For example, the panel connection member 400 may attach the display panel 100 on the supporting member 300. The panel connection member 400 according to an embodiment of the present disclosure may be implemented with a double-sided tape, a single-sided tape, a double-sided adhesive foam pad, or a single-sided adhesive foam pad, but embodiments are not limited thereto.

The display apparatus according to an embodiment of the present disclosure may further include a front member 500 which covers the periphery (or edge) of the front surface of the display panel 100. The front member 500 may have a picture frame shape which includes an opening portion overlapping the display area AA of the display panel 100. For example, the front member 500 may be coupled or connected to the rear surface portion 310 or the middle frame and may cover the periphery (or edge) of the front surface of the display panel 100, thereby supporting or fixing the display panel 100. The front member 500 may be disposed at the front edge of the display panel 100 and may be directly exposed at a user (or a viewer), and due to this, an aesthetic design appearance of the display apparatus 10 may be reduced and a bezel width of the display apparatus 10 may increase. To solve such a problem, the display panel 100 may be connected to the supporting member 300 by the panel connection member 400, and thus, the front member 500 may be omitted (or removed), thereby decreasing the bezel width of the display apparatus 10 and enhancing the aesthetic design appearance of the display apparatus 10. The vibration generating device 200 may be disposed on the rear surface (or a backside surface) of the display panel 100. The vibration generating device 200 may be attached on the rear surface of the display panel 100 by an adhesive member 150.

The adhesive member 150 according to an embodiment of the present disclosure may be disposed between the rear surface of the display panel 100 and the vibration generating device 200. For example, the adhesive member 150 may include an adhesive or a double-sided adhesive tape including an adhesive layer which is good in an adhesive force or an attaching force. For example, the adhesive layer of the adhesive member 150 may include epoxy, acryl, silicone, urethane, or paraffin wax, but embodiments are not limited thereto. The adhesive layer of the adhesive member 150 may further include an additive such as a tackifier, a wax component, or an anti-oxidation agent.

According to another embodiment of the present disclosure, the adhesive member 150 may further include a hollow portion provided between the display panel 100 and the vibration generating device 200. The hollow portion of the adhesive member 150 may provide an air gap between the display panel 100 and the vibration generating device 200. Due to the air gap, a sound wave (or a sound pressure level) based on a vibration of the vibration generating device 200 may not be dispersed by the adhesive member 150 and may concentrate on the display panel 100, and thus, the loss of a vibration caused by the adhesive member 150 may be minimized, thereby increasing a sound pressure level characteristic of a sound generated based on a vibration of the display panel 100.

The vibration generating device 200 according to an embodiment of the present disclosure may be implemented as a film type. The vibration generating device 200 may have a thickness which is thinner than that of the display panel 100, and thus, a thickness of the display panel 100 may not increase despite the arrangement of the vibration generating device 200. The vibration generating device 200 may be referred to as a sound generating module, a sound generating device, a film actuator, a film type piezoelectric composite actuator, a film speaker, a film type piezoelectric speaker, or a film type piezoelectric composite speaker, which uses the display panel 100 as a vibration plate, but the terms are not limited thereto.

Moreover, the vibration generating device 200 according to an embodiment of the present disclosure may have a size corresponding to the display area AA of the display panel 100. A size of the vibration generating device 200 may be 0.9 to 1.1 times a size of the display area AA, but embodiments are not limited thereto. For example, a size of the vibration generating device 200 may be the same as or approximately equal to that of the display area AA of the display panel 100, and thus, the vibration generating device 200 may cover a most region of the display panel 100 and a vibration generated by the vibration generating device 200 may vibrate a whole portion of the display panel 100, and thus, localization of a sound may be high and an enhanced sound may be provided to consumers.

Also, a contact area (or panel coverage) between the display panel 100 and the vibration generating device 200 may increase, and thus, a vibration region of the display panel 100 may increase, thereby improving a sound of a middle-pitched to low-pitched sound band generated based on a vibration of the display panel 100. Also, in a large-sized display apparatus, a whole portion of the display panel 100 having a large size (or a large area) may vibrate, and thus, localization of a sound based on a vibration of the display panel 100 may be more enhanced, thereby realizing a stereophonic sound effect.

Therefore, the vibration generating device 200 according to an embodiment of the present disclosure may be disposed on the rear surface of the display panel 100 to sufficiently vibrate the display panel 100 in a vertical (or horizontal) direction, thereby outputting a desired sound to a forward region in front of the display apparatus. Also, the vibration generating device 200 may be implemented in a pattern shape including an organic material portion and an inorganic material portion, and thus, an area (or a size) of the vibration generating device 200 may infinitely increase, whereby the panel coverage of the vibration generating device 200 may increase with respect to the display panel 100 to enhance a sound characteristic based on a vibration of the display panel 100.

Moreover, the vibration generating device 200 may be implemented with one film, and thus, may be slimmed, thereby reducing or preventing the increase in a driving voltage. For example, the vibration generating device 200 may be configured to have a wide area corresponding to the same size as that of the display panel 100, and thus, a sound pressure characteristic of a low-pitched sound band which is a drawback of a film type piezoelectric or a stack type piezoelectric may be improved and the driving voltage may be reduced. Also, the vibration generating device 200 according to an embodiment of the present disclosure may include the inorganic material portion and the organic material portion and may be implemented as a thin film type, and thus, may be integrated into or equipped in the display apparatus 10 without interference caused by a mechanical element and/or another element configuring the display apparatus 10.

The vibration generating device 200 may vibrate based on an electrical signal to vibrate the display panel 100. For example, the vibration generating device 200 may be a sound generating device which vibrates based on a signal synchronized with an image displayed by the display panel 100 to vibrate the display panel 100, thereby generating a sound. As another example, the vibration generating device 200 may be a haptic device which vibrates based on a haptic feedback signal (or a tactile feedback signal) synchronized with a user touch applied to a touch panel (or a touch sensor layer) disposed in or embedded into the display panel 100 to vibrate the display panel 100. For example, the vibration generating device 200 may be a haptic device which vibrates the display panel 100 to output a feedback based on an action of a user. Accordingly, the display panel 100 may vibrate based on a vibration of the vibration generating device 200 to provide a user (or a viewer) with at least one or more of a sound and a haptic feedback.

The vibration generating device 200 according to an embodiment of the present disclosure may be implemented to generate and receive a frequency of a band for sensing an image or the like, and thus, may be implemented as a vibration generating device for fingerprint recognition.

Figure 3:
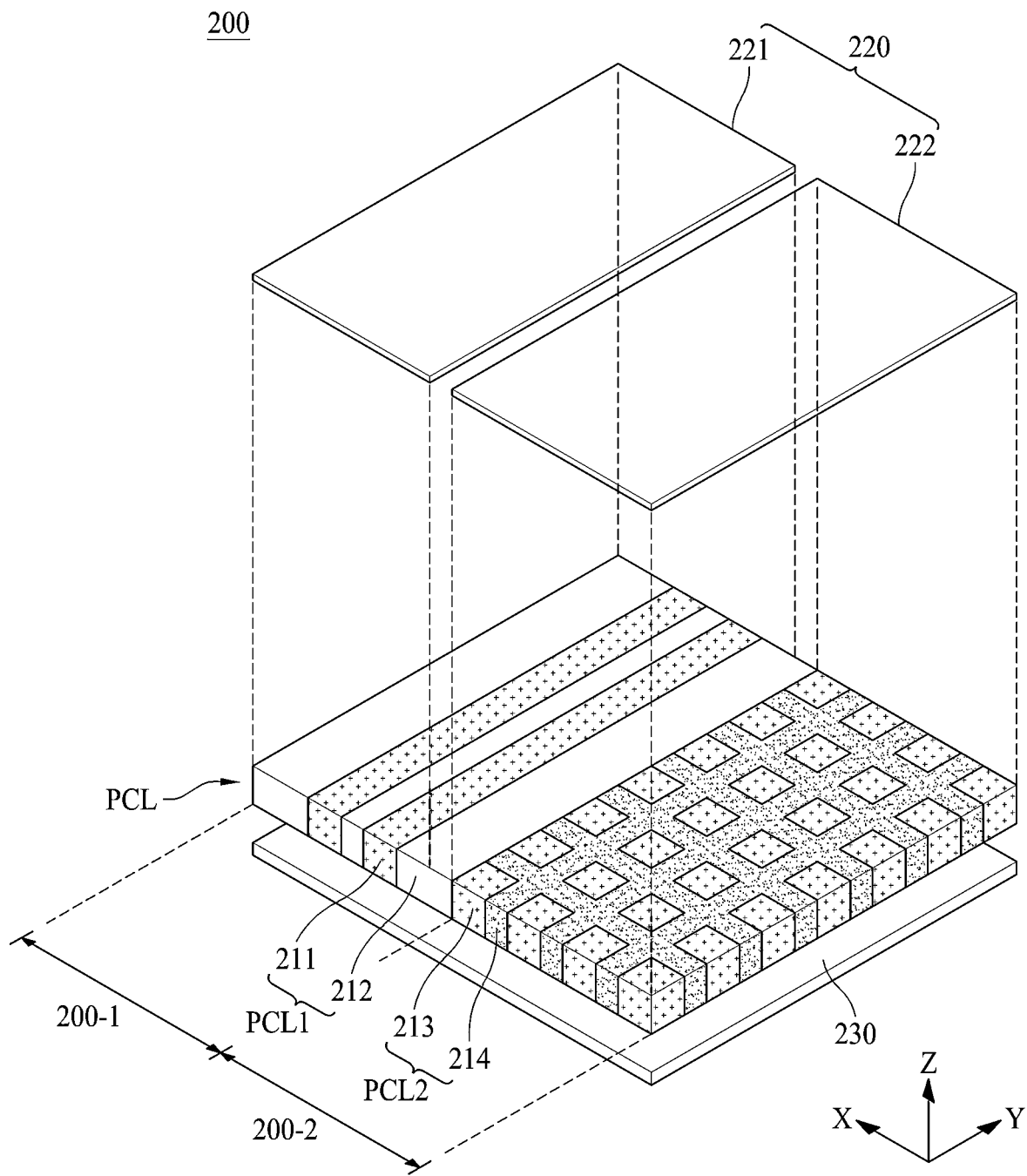
FIG. 3 illustrates a vibration generating device according to an embodiment of the present disclosure.

FIG. 3 illustrates a vibration generating device 200 according to an embodiment of the present disclosure.

With reference to FIG. 3, the vibration generating device 200 according to an embodiment of the present disclosure may include a piezoelectric composite layer PCL, a first electrode 220, and a second electrode 230.

The vibration generating device 200 may divisionally operate in different vibration modes. For example, the piezoelectric composite layer PCL may include a first region 200-1, which operates in a first vibration mode, and a second region 200-2 which operates in a second vibration mode. According to an embodiment of the present disclosure, the first region 200-1 operating in the first vibration mode may operate as a haptic actuator, a speaker actuator, or a receiver actuator, and the second region 200-2 operating in the second vibration mode may operate as a sensing actuator. For example, the piezoelectric composite layer PCL including the first region 200-1 and the second region 200-2 may be a piezoelectric composite, a piezoelectric structure, or a piezoelectric composite body.

For example, a vibration generating device corresponding to the first region 200-1 may be a first vibration generating device, and a vibration generating device corresponding to the second region 200-2 may be a second vibration generating device. The first and second vibration generating devices may be referred to by the same reference numerals as the first and second regions.

According to some embodiments of the present disclosure, the first region (or the first vibration generating device) 200-1 of the vibration generating device 200 and the second region (or the second vibration generating device) 200-2 of the vibration generating device 200 may be implemented to have different frequency characteristics. Accordingly, the vibration generating device 200 according to an embodiment of the present disclosure may be implemented to have different frequency characteristics in one film. For example, the vibration generating device 200 according to an embodiment of the present disclosure may be implemented to have different resonance frequency (or natural frequency) characteristics in a single piezoelectric composite PCL (or a piezoelectric structure).

According to some embodiments of the present disclosure, the first region 200-1 may be used as only one or more actuators of a haptic actuator, a speaker actuator, and a receiver actuator. According to some embodiments of the present disclosure, the first region 200-1 may be used as two or more actuators of a haptic actuator, a speaker actuator, and a receiver actuator. According to some embodiments of the present disclosure, the first region 200-1 may further include a haptic region, a speaker region, and a receiver region.

According to some embodiments of the present disclosure, the second region 200-2 may be implemented to perform the same function as that of the first region 200-1, and in a case where the second region 200-2 performs the same function as that of the first region 200-1, a function of the first region 200-1 may be more reinforced or amplified. In the vibration generating device 200, an arrangement ratio and an arrangement position of the first region 200-1 and the second region 200-2 may be variously adjusted.

The piezoelectric composite layer PCL may include a first piezoelectric composite layer PCL1 disposed in the first region 200-1 and a second piezoelectric composite layer PCL2 disposed in the second region 200-2. The first piezoelectric composite layer PCL1 and the second piezoelectric composite layer PCL2 may operate in different composite structures or different vibration modes. For example, the first piezoelectric composite layer PCL1 may have a vibration characteristic having a frequency of about 10 kHz to about 20 kHz and the second piezoelectric composite layer PCL2 may have a vibration characteristic having a frequency of about 10 MHz to about 30 MHz, but embodiments of the present disclosure are not limited thereto. For example, the first piezoelectric composite layer PCL1 may include a 2-2 composite having a piezoelectric characteristic of a 2-2 vibration mode and the second piezoelectric composite layer PCL2 may include a 1-3 composite having a piezoelectric characteristic of a 1-3 vibration mode, but embodiments of the present disclosure are not limited thereto.

The properties of a composite are strongly associated with the connectivity of its components, wherein connectivity is defined as the arrangement of the active and passive phases in the composite. Therefore, a 2-2 composite or connectivity includes alternating layers of the two phases, as illustrating in the first region of FIG. 3. A composite connectivity of 1-3 composite is widely used since this connectivity can efficiently use the geometrical advantages of piezoelectric materials, offering highest electromechanical coupling factors. Therefore, in a 1-3 composite, a piezoelectric active component or portion is surrounded by a grid providing a passive phase or passive portion. In the embodiment of the present disclosure, the 1-3 composite or 1-3 vibration mode is illustrated in the second region of FIG. 3.

For example, the piezoelectric composite layer PCL may be formed by a dicing process, but a process of forming the piezoelectric composite layer PCL is not limited to a dicing process. For example, the piezoelectric composite layer PCL may be formed through a process of forming a plate by using a material which is included in a plurality of first portions 211 and 213 of the piezoelectric composite layer PCL, a process of removing a region, where a plurality of second portions 212 and 214 are to be disposed, in the plate, and a process of filling a material of the second portion 212 and 214 into a removed region.

According to some embodiments of the present disclosure, the first piezoelectric composite layer PCL1 may be implemented with a haptic actuator, a speaker actuator, or a receiver actuator, and the second piezoelectric composite layer PCL1 may be implemented with a sensing actuator.

Moreover, each of the first and second piezoelectric composite layers PCL1 and PCL2 may include the plurality of first portions 211 and 213 and the plurality of second portions 212 and 214. The first portions 211 and 213 may have a piezoelectric characteristic, and the second portions 212 and 214 may be disposed near the first portions 211 and 213 and may complement an impact resistance of each of the first portions 211 and 213 and may have insulating properties and flexibility.

In the piezoelectric composite layer PCL, an arrangement ratio and an arrangement position of the first piezoelectric composite layer PCL1 and the second piezoelectric composite layer PCL2 may be variously adjusted.

For example, as illustrated in FIG. 3, the first piezoelectric composite layer PCL1 and the second piezoelectric composite layer PCL2 may be disposed to be connected to a side surface thereof by using the second portion 212 of the first piezoelectric composite layer PCL1 as a boundary.

As in an embodiment of the present disclosure, in a case where the second piezoelectric composite layer PCL2 operates as a sensing actuator, Young's modulus of the second portion 214 of the second piezoelectric composite layer PCL2 may be lower than that of the second portion 212 of the first piezoelectric composite layer PCL1 so that a signal generated by the second piezoelectric composite layer PCL2 and a signal received by the second piezoelectric composite layer PCL2 are quickly attenuated and do not overlap.

For example, the second portion 212 of the first piezoelectric composite layer PCL1 may have a strong oscillation characteristic and/or may include a material which is low in vibration attenuation effect (or damping characteristic). The second portion 212 of the first piezoelectric composite layer PCL1 may include a material having high Young's modulus. For example, the second portion 212 of the first piezoelectric composite layer PCL1 may have Young's modulus of 3 GPa or more. For example, the second portion 212 of the first piezoelectric composite layer PCL1 may include an epoxy-based polymer, but embodiments are not limited thereto. The second portion 214 of the second piezoelectric composite layer PCL2 may have an oscillation and reception characteristic and/or may include a material which is high in vibration attenuation effect (or damping characteristic). The second portion 214 of the second piezoelectric composite layer PCL2 may include a material having low Young's modulus. For example, the second portion 214 of the second piezoelectric composite layer PCL2 may have Young's modulus of about 0.1 GPa to about 2.5 GPa. For example, the second portion 214 of the second piezoelectric composite layer PCL2 may include at least one of a urethane-based polymer, an acryl-based polymer, or a polyvinylidene fluoride (PVDF)-based polymer.

As another example, in a case where the second piezoelectric composite layer PCL2 is implemented as a haptic actuator, a speaker actuator, or a receiver actuator, the second piezoelectric composite layer PCL2 may be simultaneously implemented with a haptic actuator, a speaker actuator, or a receiver actuator and a sensing actuator by applying a signal having a corresponding frequency. In this case, Young's modulus of the second piezoelectric composite layer PCL2 may be 100 MPa or more.

Each of a plurality of first portions 211 of the first piezoelectric composite layer PCL1 may include an inorganic material portion and may include a polygonal pattern. For example, each of the plurality of first portions 211 may be a line pattern having a certain width. For example, the plurality of first portions 211 may be spaced apart from one another by a certain interval in a first direction X. Each of the plurality of first portions 211 may be disposed in parallel along a second direction Y intersecting with the first direction X.

According to some embodiments of the present disclosure, the plurality of first portions 211 of the first piezoelectric composite layer PCL1 may be spaced apart from one another by a certain interval in the second direction Y and may be disposed in parallel with the first direction X.

Each of a plurality of second portions 212 of the first piezoelectric composite layer PCL1 may include an organic material portion and may be disposed to fill a region between adjacent inorganic material portions which are the first portions 211.

Therefore, the plurality of first and second portions 211 and 212 of the first piezoelectric composite layer PCL1 may be alternately arranged as a line type or a stripe type.

The two second portions 212 of the first piezoelectric composite layer PCL1 being arranged at the edge of the first piezoelectric composite layer PCL1 may have a larger width than the first portions 211 in the first piezoelectric composite layer PCL1. For example, the second portion 212 being arranged between the two first portions 211 of the first piezoelectric composite layer PCL1 may be smaller in width than the two first portions 211 of the first piezoelectric composite layer PCL1 and the two second portions 212 of the first piezoelectric composite layer PCL1 being arranged at the edge portion of the first piezoelectric composite layer PCL1.

A plurality of first portions 213 of the second piezoelectric composite layer PCL2 may each include an inorganic material portion and may be arranged in a lattice structure where the plurality of first portions 213 are spaced apart from one another in the first direction X and the second direction Y. Also, a plurality of second portions 214 of the second piezoelectric composite layer PCL2 may each include an organic material portion and may be arranged in a matrix structure where each of the plurality of second portions 214 is disposed between adjacent first portions 213 of the plurality of first portions 213. According to some embodiments, the plurality of first and second portions 213 and 214 may be alternately arranged as a line type or a stripe type. To perform precise and accurate image sensing, at least one of widths of the first and second portions 213 and 214 of the second piezoelectric composite layer PCL2 may be adjusted to be less than a width of the first and second portions 211 and 213 of the first piezoelectric composite layer PCL1, and thus, the second portion 214 of the second piezoelectric composite layer PCL2 and the first portion 211 of the first piezoelectric composite layer PCL1 may be disposed per unit area.

Therefore, each of the plurality of second portions 214 may be configured to fill a gap between two adjacent first portions 213 of the plurality of first portions 213 and to surround a corresponding first portion 213 of the plurality of first portions 213, and thus, may be connected to or attached on an adjacent first portion 213.

Moreover, in a case where the second piezoelectric composite layer PCL2 is driven for sensing, some of the plurality of first portions 213 may be used for ultrasound oscillation, and the other first portions 213 may be used to receive an ultrasound.

Each of the plurality of first portions 211 and 213 of the first and second piezoelectric composite layers PCL1 and PCL2 according to an embodiment of the present disclosure may be configured as an inorganic material portion. The inorganic material portion may include an electro active material. The electro active material may have a characteristic (a piezoelectric characteristic) where pressure or twisting is applied to a crystalline structure by an external force, a potential difference occurs due to dielectric polarization caused by a relative position change of a positive (+) ion and a negative (−) ion, and a vibration is generated by an electric field based on a voltage applied thereto. For example, each of the plurality of first portions 211 may be referred to as an electroactive portion, an inorganic material portion, a piezoelectric material portion, or a vibration portion, but the terms are not limited thereto.

Each of the plurality of first portions 211 and 213 according to an embodiment of the present disclosure may be formed of a ceramic-based material for generating a relatively high vibration, or may be formed of piezoelectric ceramic having a perovskite-based crystalline structure. The perovskite crystalline structure may have a piezoelectric effect and an inverse piezoelectric effect and may be a plate-shaped structure having orientation. The perovskite crystalline structure may be represented by a chemical formula "$ABO_3$". Here, A may include a divalent metal element, and B may include a tetravalent metal element. For example, in the chemical formula "$ABO_3$", A and B may be cations, and O may be anions. For example, the chemical formula "$ABO_3$" may include one of $PbTiO_3$, $PbZrO_3$, $BaTiO_3$, and $SrTiO_3$, but embodiments are not limited thereto.

When the perovskite crystalline structure includes a center ion (for example, $PbTiO_3$), a position of a Ti ion may be changed by an external stress or a magnetic field, and thus, polarization may be changed, thereby generating a piezoelectric effect. For example, in the perovskite crystalline structure, a cubic shape corresponding to a symmetric structure may be changed to a tetragonal, orthorhombic, or rhombohedral structure corresponding to an unsymmetric structure, and thus, a piezoelectric effect may be generated.

In a tetragonal, orthorhombic, or rhombohedral structure corresponding to an unsymmetric structure, polarization may be high in a morphotropic phase boundary, and realignment of polarization may be easy, whereby the perovskite crystalline structure may have a high piezoelectric characteristic.

For example, the inorganic material portion provided in each of the plurality of first portions 211 and 213 may include one or more materials of lead (Pb), zirconium (Zr), titanium (Ti), zinc (Zn), nickel (Ni), and niobium (Nb), but embodiments are not limited thereto.

As another example, the inorganic material portion provided in each of the plurality of first portions 211 and 213 may include a lead zirconate titanate (PZT)-based material including lead (Pb), zirconium (Zr), and titanium (Ti) or may include a lead zirconate nickel niobate (PZNN)-based material including lead (Pb), zirconium (Zr), nickel (Ni), and niobium (Nb), but embodiments are not limited thereto. Also, the inorganic material portion may include at least one or more of $CaTiO_3$, $BaTiO_3$, and $SrTiO_3$ without Pb, but embodiments are not limited thereto.

Each of the plurality of second portions 212 and 214 may include organic material portions. The plurality of second portions 212 and 214 may be disposed between two adjacent first portions 211 and 213 of the plurality of first portions 211 and 213 and may absorb an impact applied to the first portions 211 and 213, may release a stress concentrating on the first portions 211 and 213 to enhance the total durability of the vibration generating device 200, and may provide flexibility to the vibration generating device 200. The vibration generating device 200 may have flexibility, and thus, may be bent in a shape corresponding to that of the display panel 100.

Therefore, each of the plurality of second portions 212 and 214 may be disposed between two adjacent first portions of the plurality of first portions 211 and 213, and thus, the plurality of first portions 211 and 213 and the plurality of second portions 212 and 214 may be disposed (or arranged) on the same plane (or the same layer) in parallel. Also, each of the plurality of second portions 212 and 214 may be configured to fill a gap between two adjacent first portions of the plurality of first portions 211 and 213 and may be connected to or attached on first portions 211 and 213 adjacent thereto. Therefore, in the vibration generating device 200, vibration energy based on a link in a unit lattice of the first portions 211 and 213 may be increased by the second portions 212 and 214, and thus, a vibration characteristic may increase and a piezoelectric characteristic and flexibility may be secured.

Moreover, in the vibration generating device 200, the plurality of first portions 211 and 213 and the plurality of second portions 212 and 214 may be disposed on the same plane in a lengthwise direction X with respect to one side of the vibration generating device 200 and thus may configure a large-area composite film (or an organic/inorganic composite film) having a single-layer structure, and the large-area composite film may have a thin thickness, whereby a thickness of the display apparatus 10 may not increase.

Therefore, in the vibration generating device 200 of the display apparatus 10 according to an embodiment of the present disclosure, an inorganic material portion (a first portion) and an organic material portion (a second portion) may be disposed on the same layer, and thus, an impact transferred to the inorganic material portion may be absorbed by the organic material portion, thereby preventing the inorganic material portion from being damaged by an external impact applied from the outside to the display apparatus 10 and minimizing a reduction in vibration performance (or a reduction in sound performance) caused by damage.

Moreover, the vibration generating device 200 of the display apparatus according to an embodiment of the present disclosure may include piezoelectric ceramic having a perovskite crystalline structure, and thus, may vibrate (or mechanical displacement) in response to an electrical signal applied from the outside. For example, when an alternating current (AC) voltage is applied to the inorganic material portion (the first portion), the inorganic material portion may alternately contract and expand based on an inverse piezoelectric effect, and thus, based on a bending phenomenon where a bending direction is alternately changed, the vibration generating device 200 may vibrate to vibrate the display panel 100 based on the vibration to provide a sound or a haptic feedback to a user, whereby a generated and received ultrasound may be used for image sensing.

The first electrode 220 may be disposed on a first surface (or a front surface) of the piezoelectric composite layer PCL, and the second electrode 230 may be disposed on a second surface (or a rear surface), which is opposite to the first surface, of the piezoelectric composite layer PCL. In an embodiment of the present disclosure, the first surface of the piezoelectric composite layer PCL may be a surface opposite to the display panel 100.

The first electrode 220 may include a plurality of sub-electrodes, and the second electrode 230 may be configured with one electrode. Alternatively, the first electrode 220 may be configured with one electrode, and the second electrode 230 may include a plurality of sub-electrodes. According to some embodiments of the present disclosure, each of the first and second electrodes 220 and 230 may be configured with one electrode or a plurality of sub-electrodes. The first electrode 220 or the second electrode 230 configured with one electrode may be disposed to correspond to a whole region of the piezoelectric composite layer PCL.

The first electrode 220 may include one first sub-electrode 221 disposed on a first surface of the first piezoelectric composite layer PCL1 and a second sub-electrode 222 which is spaced apart from the first sub-electrode 221 and is disposed on a first surface of the second piezoelectric composite layer PCL2. There is a predetermined gap between the first sub-electrode 221 and the second sub-electrode 222 to provide or receive a separate signal to/from the first piezoelectric composite layer PCL1 or second piezoelectric composite layer PCL2 being distinguished from each other.

For example, the second electrode 230 may be a common electrode or a lower electrode. For example, the first sub-electrode 221 may correspond to the first piezoelectric composite layer PCL1. The first sub-electrode 221 may be a first upper electrode which corresponds to a haptic actuator, a speaker actuator, or a receiver actuator. For example, the second sub-electrode 222 may correspond to the second piezoelectric composite layer PCL2. The second sub-electrode 222 may be a second upper electrode which corresponds to a sensing actuator. According to an embodiment of the present disclosure, the second electrode 230 may include first and second sub-electrodes which are apart from each other and are respectively disposed on second surfaces of the first and second piezoelectric composite layers PCL1 and PCL2. According to an embodiment of the present disclosure, each of the first and second electrodes 220 and 230 may include first and second sub-electrodes which are disposed on the first and second surfaces of each of the first and second piezoelectric composite layers PCL1 and PCL2.

Each of the sub-electrodes of the first and second electrodes 220 and 230 may be disposed to correspond to an entire region of the first and second piezoelectric composite layers PCL1 and PCL2.

Each of the first and second electrodes 220 and 230 according to an embodiment of the present disclosure may include a transparent conductive material, a semitransparent conductive material, or an opaque conductive material. For example, examples of the transparent conductive material or the semitransparent conductive material may include indium tin oxide (ITO) or indium zinc oxide (IZO), but embodiments are not limited thereto. Examples of the opaque conductive material may include aluminum (Al), copper (Cu), gold (Au), silver (Ag), molybdenum (Mo), and Mg or an alloy thereof, but embodiments are not limited thereto.

FIGS. 4 to 9 illustrate a vibration generating device according to an embodiment of the present disclosure.

In FIG. 3, the first piezoelectric composite layer PCL1 and the second piezoelectric composite layer PCL2 may be disposed to be connected at its side surfaces thereof.

Here, the second first portion 212 being arranged at the edge of the first piezoelectric composite layer PCL1 adjacent the second piezoelectric composite layer PCL2 is used as a boundary. As another example, as in FIG. 4, the first piezoelectric composite layer PCL1 and the second piezoelectric composite layer PCL2 may be disposed to be connected to a side surface thereof by using the second portion 214 of the second piezoelectric composite layer PCL2 as a boundary. According to some embodiments of the present disclosure, as illustrated in FIG. 4, the first portion 211 of the first piezoelectric composite layer PCL1 may be connected to the second portion 214 of the second piezoelectric composite layer PCL2, and thus, the first piezoelectric composite layer PCL1 and the second piezoelectric composite layer PCL2 may be disposed to be connected to a side surface thereof.

Figure 5:
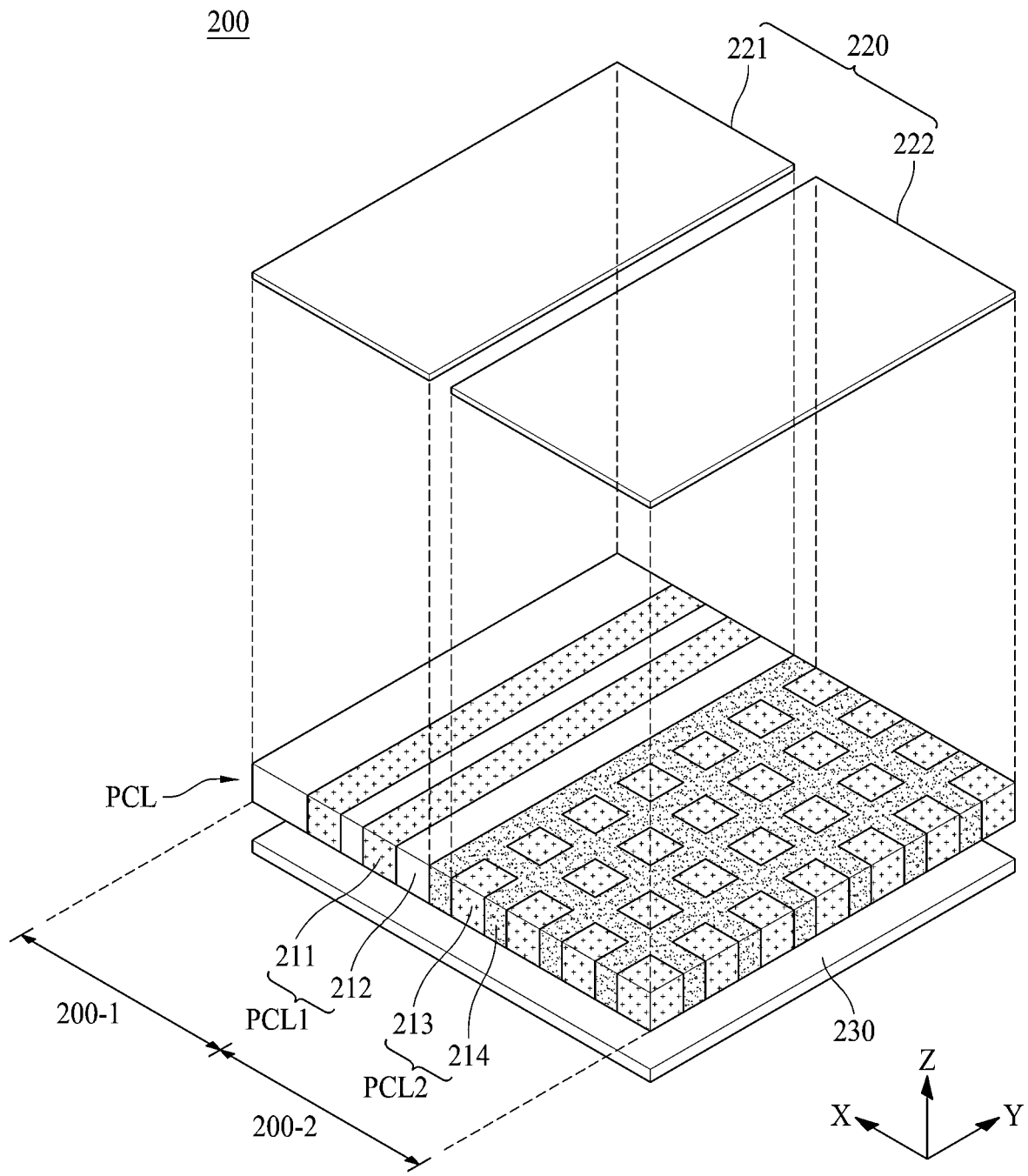

According to the embodiment as illustrated in FIG. 5, the second portion 212 of the first piezoelectric composite layer PCL1 may be connected to the second portion 214 of the second piezoelectric composite layer PCL2, and thus, the first piezoelectric composite layer PCL1 and the second piezoelectric composite layer PCL2 may be disposed to be connected to a side surface thereof. In the embodiment of the present disclosure, the width of the second portions 212 of the first piezoelectric composite layer PCL1 is different. Thus, the edge portion may have also different widths.

Figure 4:
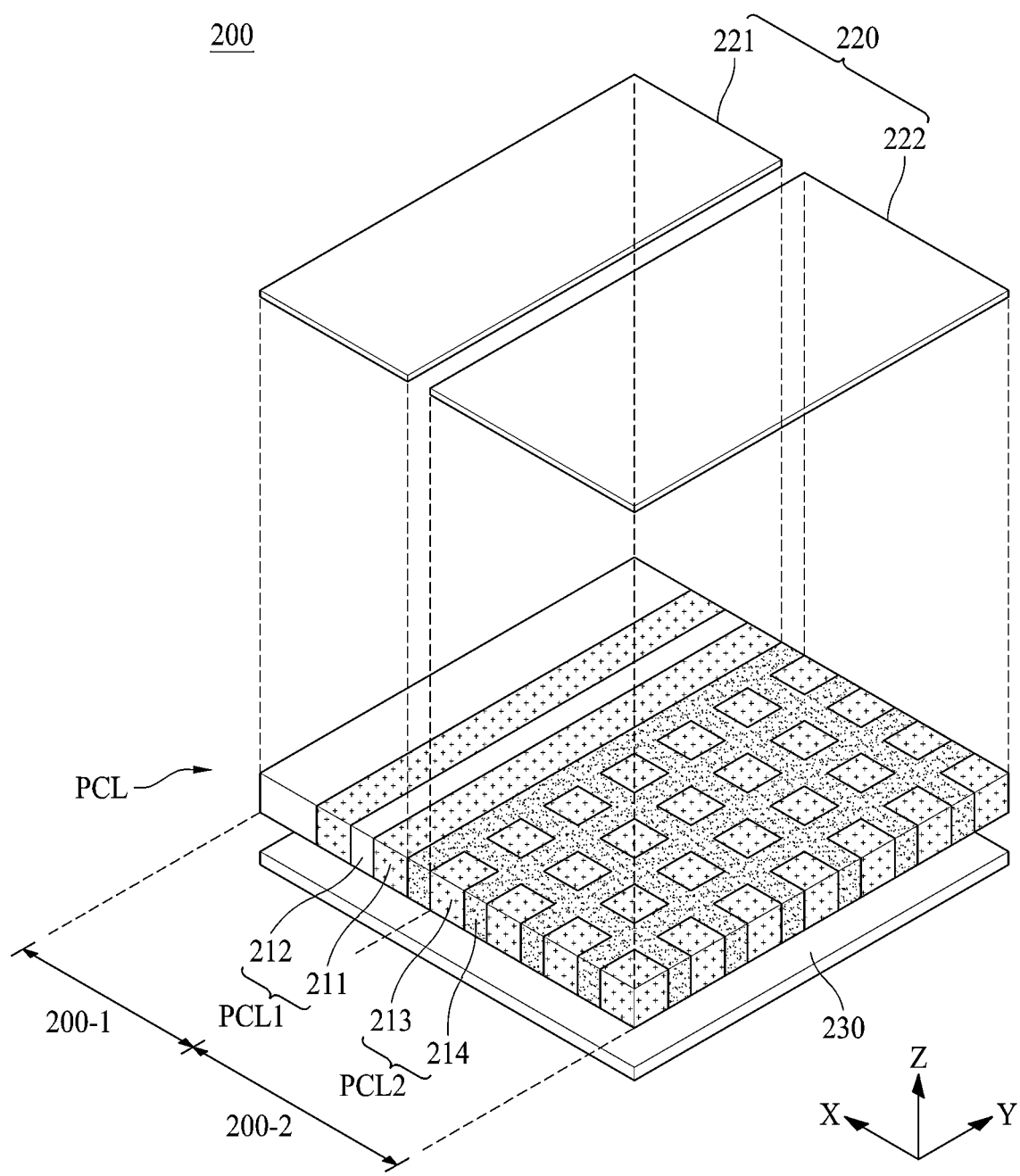
FIGS. 4 to 9 illustrate a vibration generating device according to an embodiment of the present disclosure.
Figure 6:
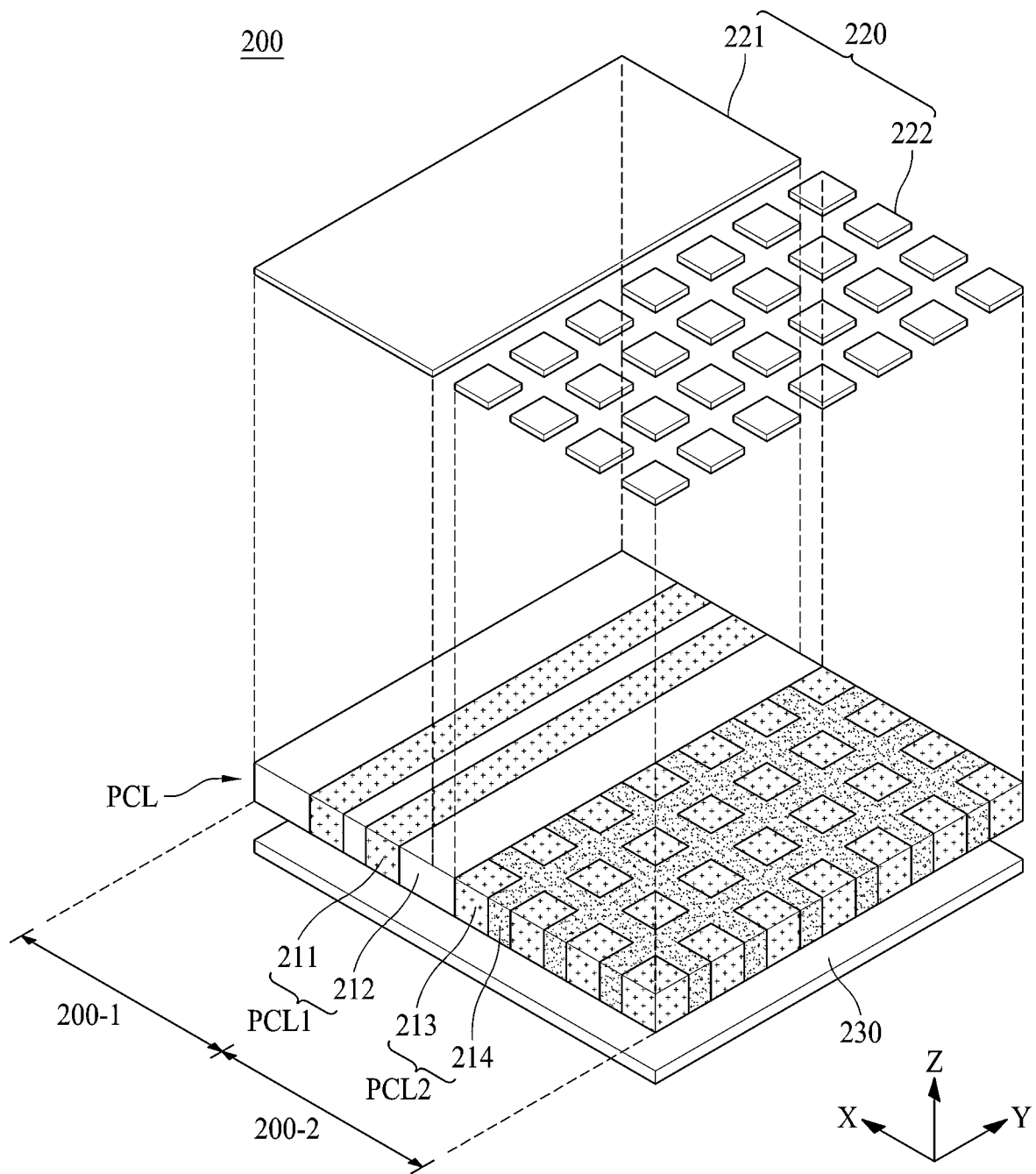

With reference to FIGS. 4 to 6, a first electrode 220 may include one first sub-electrode 221 disposed on a first surface of a first piezoelectric composite layer PCL1 and a plurality of second sub-electrodes 222 which are respectively disposed on first surfaces of a plurality of first portions 213 of a second piezoelectric composite layer PCL2. According to some embodiments of the present disclosure, a second electrode 230 may include one first sub-electrode disposed on a second surface of the first piezoelectric composite layer PCL1 and a plurality of second sub-electrodes 222 which are respectively disposed on second surfaces of a plurality of first portions 213 of the second piezoelectric composite layer PCL2. For example, the second electrode 230 may be a common electrode or a lower electrode. For example, the first sub-electrode 221 may correspond to the first piezoelectric composite layer PCL1. The first sub-electrode 221 may be a first upper electrode which corresponds to a haptic actuator, a speaker actuator, or a receiver actuator. For example, the second sub-electrode 222 may correspond to the second piezoelectric composite layer PCL2. The second sub-electrode 222 may be a second upper electrode which corresponds to a sensing actuator. According to some embodiments of the present disclosure, each of the first and second electrodes 220 and 230 may include one first sub-electrode 221 disposed on each of first and second surfaces of the first piezoelectric composite layer PCL1.

According to some embodiments of the present disclosure, each of the first and second electrodes 220 and 230 may include a plurality of second sub-electrodes which are respectively disposed on first and second surfaces of the plurality of first portions 213 of the second piezoelectric composite layer PCL2. Therefore, as illustrated in FIG. 6, the second electrode being arranged at the lower surface in the FIG. 6 covers both, the first and second piezoelectric composite layer PCL1, PCL2. The first electrode 220 is composed of one first sub-electrode 221 covering the first piezoelectric composite layer PCL1, and a plurality of second sub-electrodes 222 covering respectively only the first portions of the second piezoelectric composite layer PCL2 and having a gap or distance to each other.

Figure 7:
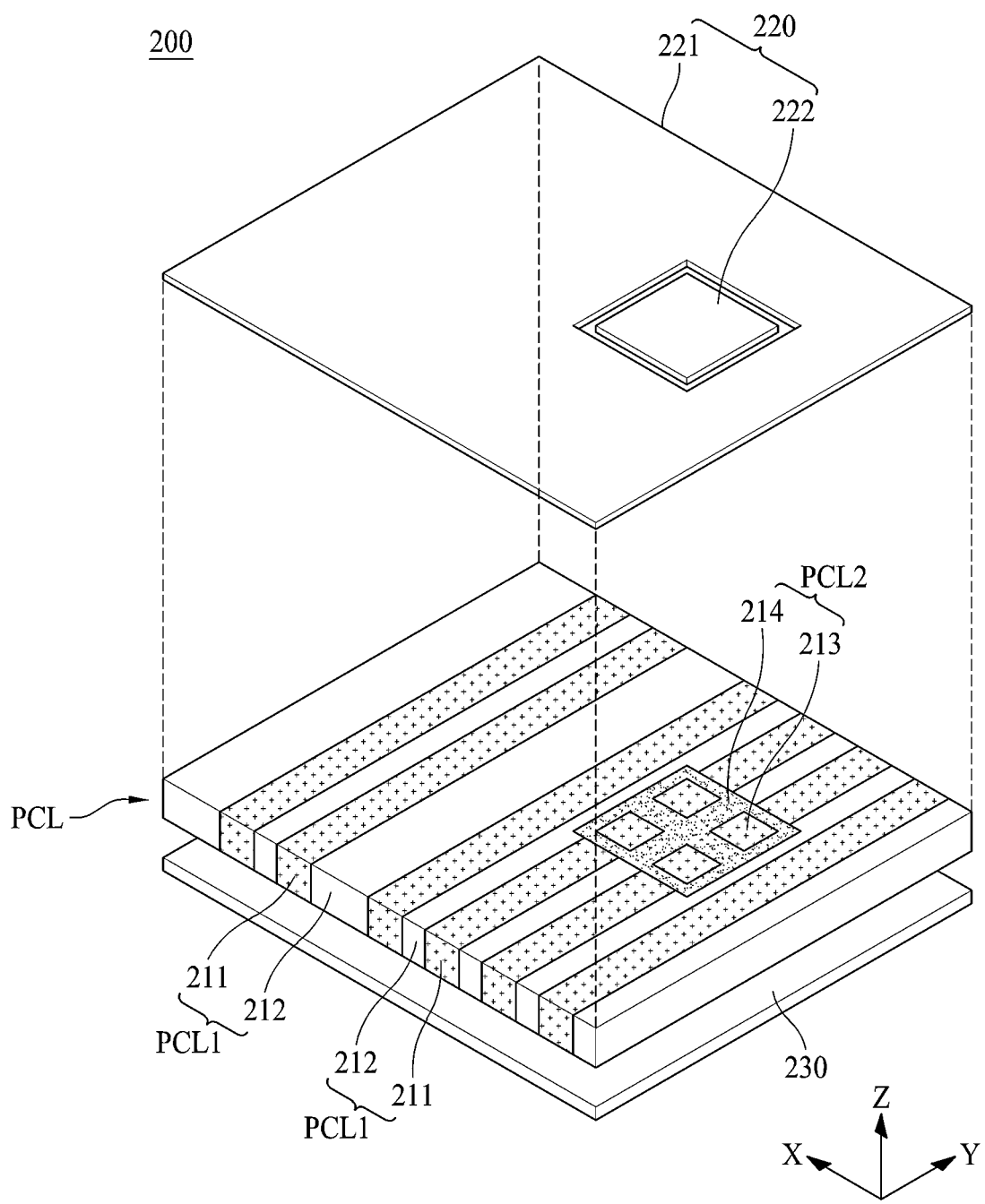

The second piezoelectric composite layer PCL2, as illustrated in FIG. 7, may be disposed between adjacent first piezoelectric composite layers PCL1. The second piezoelectric composite layer PCL2 may be disposed so that a whole side surface of the second piezoelectric composite layer PCL2 is surrounded or enclosed by the first piezoelectric composite layer PCL1. Therefore, the second piezoelectric composite layer PCL2 forms an island inside the first piezoelectric composite layer PCL1. As another example, as illustrated in FIG. 8, the second piezoelectric composite layer PCL2 may be disposed so that a portion of a side surface of the second piezoelectric composite layer PCL2 is surrounded by the first piezoelectric composite layer PCL1 or respectively surrounded by the first piezoelectric composite layers PCL1.

As illustrated in FIG. 7, one second piezoelectric composite layer PCL2 may be disposed between adjacent first piezoelectric composite layers PCL1. As another example, as illustrated in FIG. 9, a plurality of second piezoelectric composite layers PCL2 may be spaced apart from one another by a certain distance between adjacent first piezoelectric composite layers PCL1.

Figure 8:
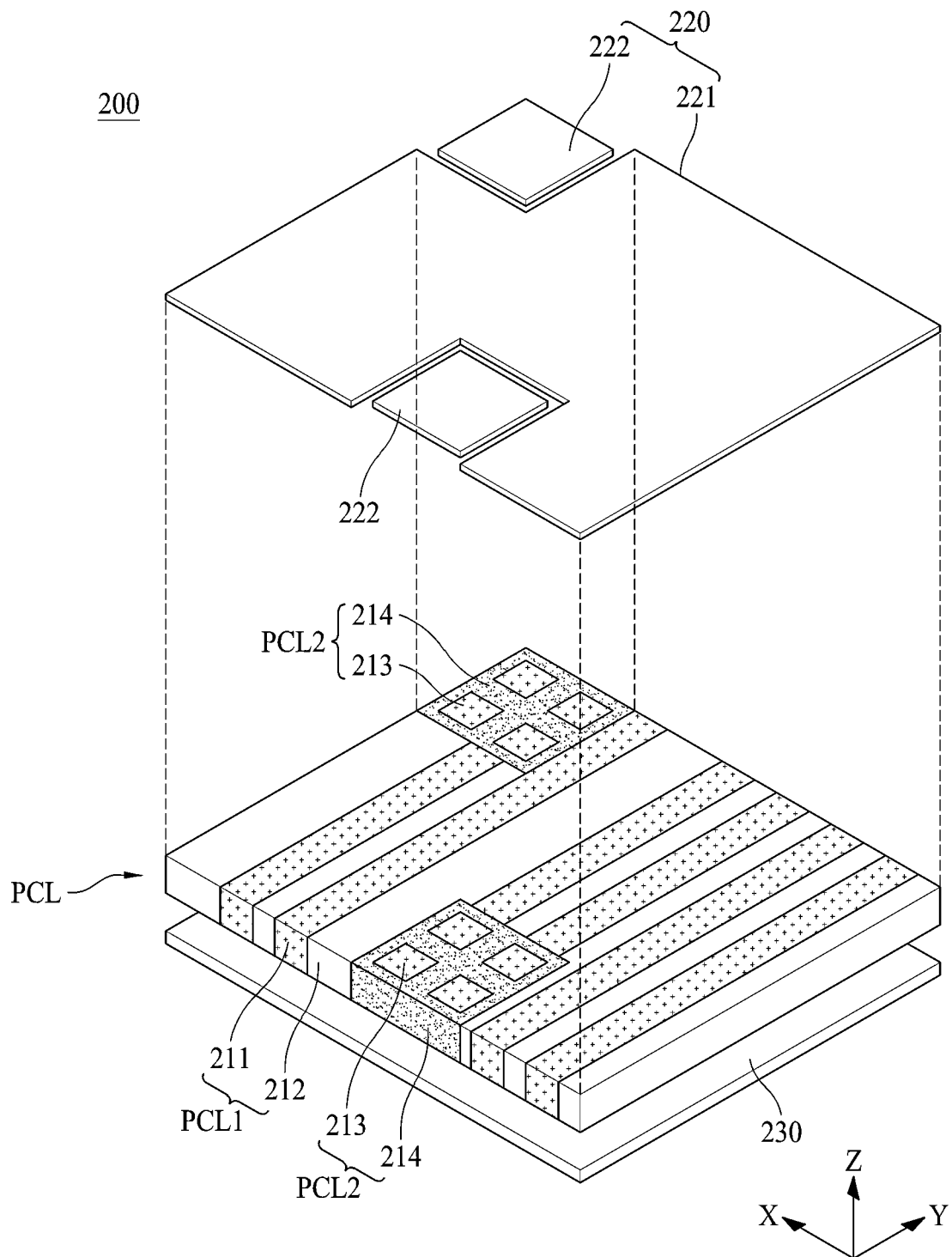
Figure 9:
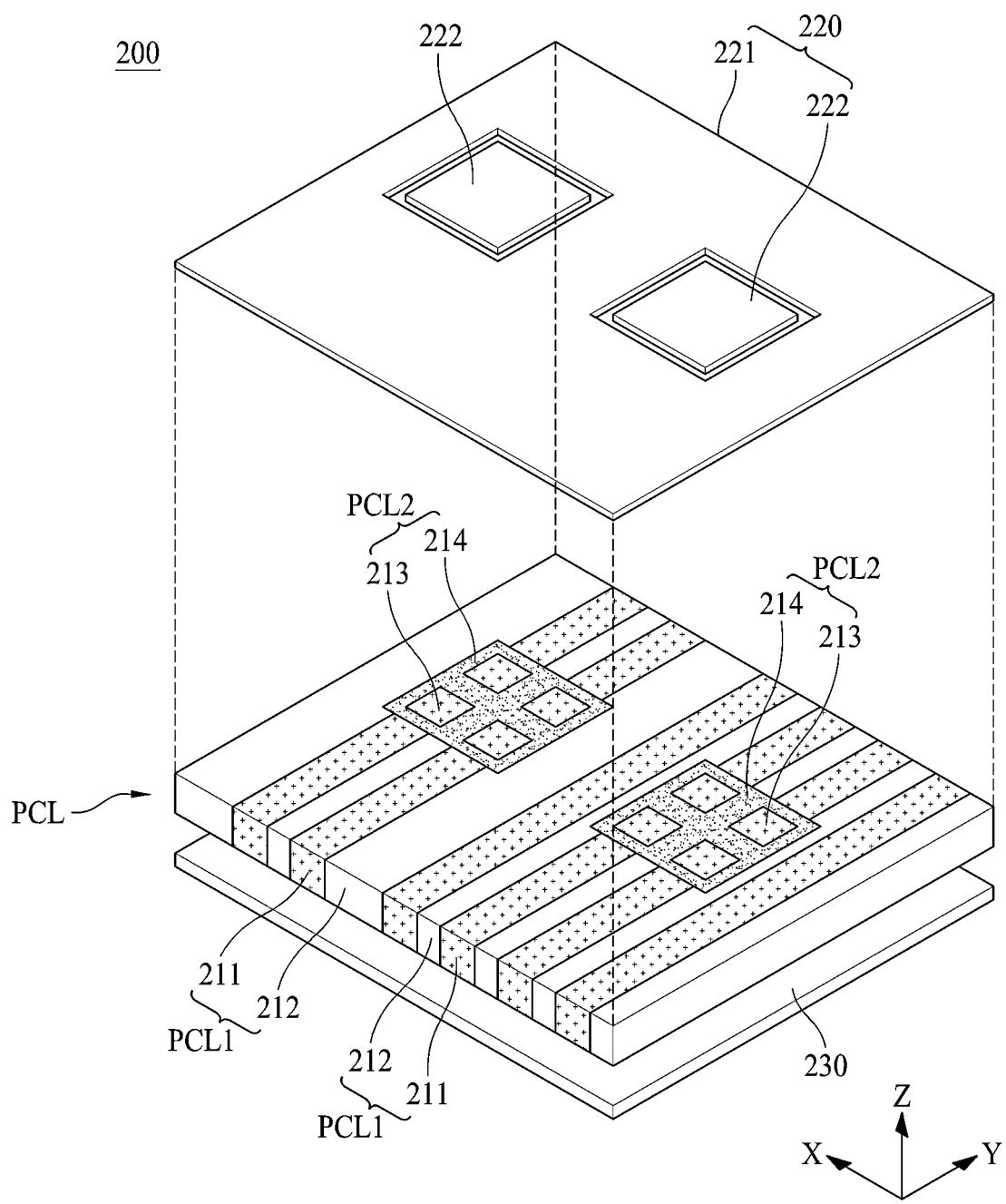

With reference to FIGS. 7 to 9, it is illustrated that a first electrode 220 includes a first sub-electrode 221 disposed on a first surface of a first piezoelectric composite layer PCL1 and one or more second sub-electrodes 222 disposed on a first surface of one or more second piezoelectric composite layers PCL2, and the second sub-electrode 222 of the first electrode 220 is disposed on a first surface of the second piezoelectric composite layer PCL2 with respect to a whole region of the second piezoelectric composite layer PCL2. For example, the second electrode 230 may be a common electrode or a lower electrode. For example, the first sub-electrode 221 may correspond to the first piezoelectric composite layer PCL1. The first sub-electrode 221 may be a first upper electrode which corresponds to a haptic actuator, a speaker actuator, or a receiver actuator. For example, the second sub-electrode 222 may correspond to the second piezoelectric composite layer PCL2. The second sub-electrode 222 may be a second upper electrode which corresponds to a sensing actuator. According to an embodiment of the present disclosure, the one or more second sub-electrodes 222 of the first electrode 220 may be disposed on a first surface of each first portion 213 of the second piezoelectric composite layer PCL2. Therefore, the size of the second sub-electrode 222 may cover the second piezoelectric composite layer PCL2 including the first and second portion of the second piezoelectric composite layer PCL2. Alternatively, there may be a plurality of second sub-electrodes 222 only covering the first portions 213 of the second piezoelectric composite layer PCL2.

According to some embodiments of the present disclosure, the second electrode 230 may include a first sub-electrode disposed on a second surface of the first piezoelectric composite layer PCL1 and a second sub-electrode disposed on a second surface of the second piezoelectric composite layer PCL2, and the second sub-electrode of the second electrode 230 may be disposed to correspond to a whole region of the second piezoelectric composite layer PCL2 or may be disposed to correspond to each first portion 213 of the second piezoelectric composite layer PCL2. According to some embodiments of the present disclosure, each of the first and second electrodes 220 and 230 may include a first sub-electrode disposed on each of first and second surfaces of the first piezoelectric composite layer PCL1 and a second sub-electrode disposed on each of first and second surfaces of the second piezoelectric composite layer PCL2. The second sub-electrode 222 of the first electrode 220 and the second sub-electrode 222 of the second electrode 230 may be disposed to correspond to a whole region of the second piezoelectric composite layer PCL2 or may be disposed to correspond to each first portion 213 of the second piezoelectric composite layer PCL2.

Figure 10:
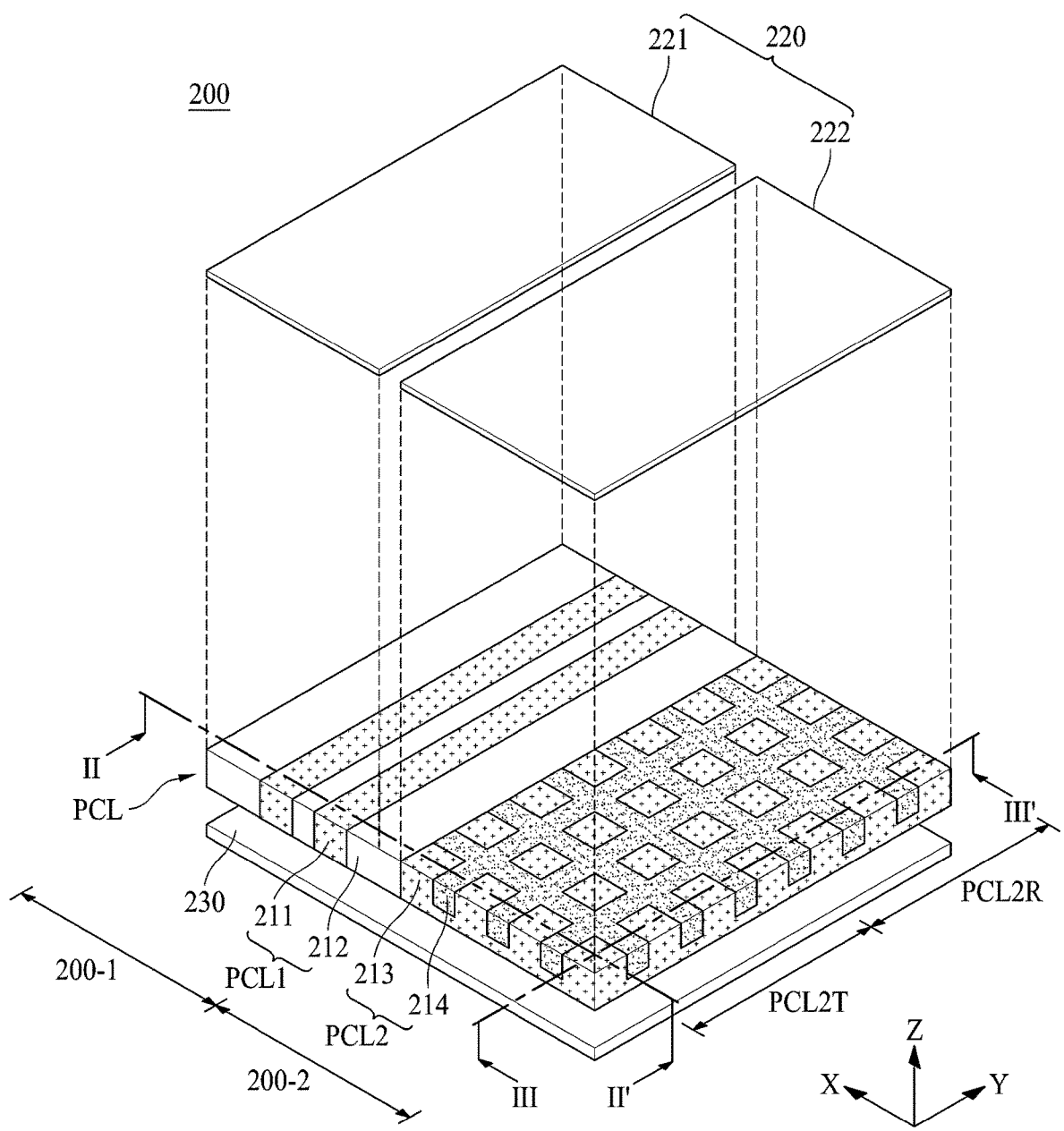
FIG. 10 illustrates a vibration generating device according to another embodiment of the present disclosure.
Figure 11:
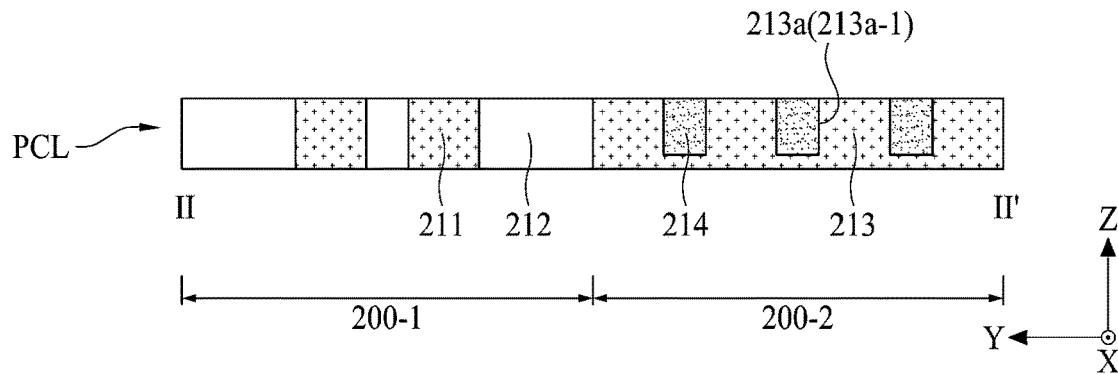
FIG. 11 is a cross-sectional view taken along line II-IF illustrated in FIG. 10.
Figure 12:
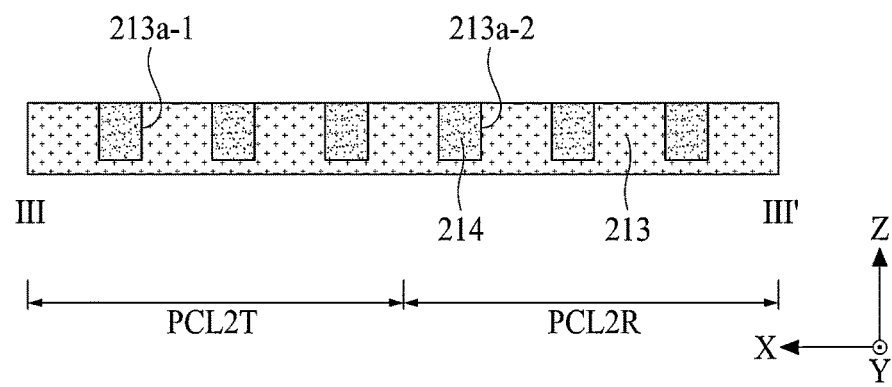
FIG. 12 is a cross-sectional view taken along line III-III' illustrated in FIG. 10.
Figure 13:
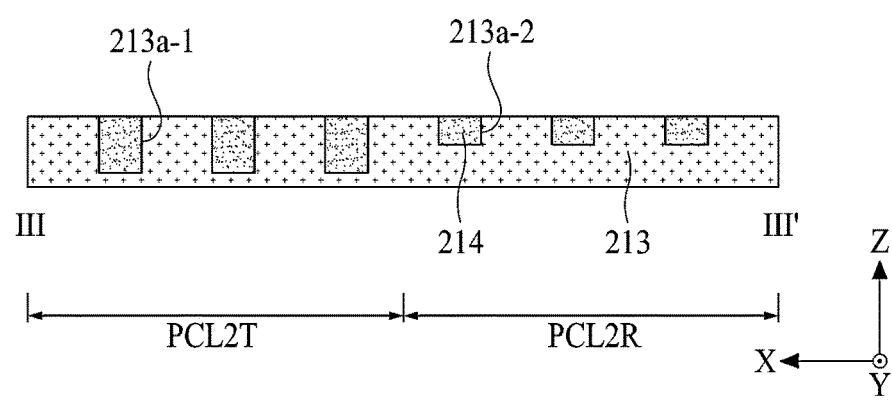
FIG. 13 is a cross-sectional view taken along line III-III' illustrated in FIG. 10 in a vibration generating device according to another embodiment of the present disclosure.

FIG. 10 illustrates a vibration generating device according to another embodiment of the present disclosure. FIG. 11 is a cross-sectional view taken along line II-II' illustrated in FIG. 10. FIG. 12 is a cross-sectional view taken along line III-III' illustrated in FIG. 10. FIG. 13 is a cross-sectional view taken along line III-III' illustrated in FIG. 10 in a vibration generating device according to another embodiment of the present disclosure.

With reference to FIGS. 3 to 9, a second piezoelectric composite layer PCL2 provided in a second region 200-2 of a vibration generating device 200 (or a second vibration generating device) may be implemented so that a second portion 214 is disposed between first portions 213 spaced apart from each other, or may be implemented so that a first portion 213 is disposed between second portions 214 spaced apart from each other. In other words, the depth or height of first and second portions 211, 213, 212, 214 is similar or corresponds to the thickness of the first or second piezoelectric composite layer PCL1, PCL2.

In an embodiment of the present disclosure, the second region 200-2 of the vibration generating device 200 may be implemented to generate and receive an ultrasound and may be for sensing, and as high ultrasound oscillation intensity and excellent reception sensitivity increase, accurate sensing may be performed. Sensing may include an ultrasound distance and/or image sensing.

Herein, to enhance ultrasound oscillation intensity and reception sensitivity by using the resonance principle, a cavity structure may be applied to the second piezoelectric composite layer PCL2.

With reference to FIGS. 10 to 13, a second piezoelectric composite layer PCL2 may include a first portion 213, which configures a body and includes a cavity 213a, and a second portion 214 which is disposed in the cavity 213a of the first portion 213. According to some embodiments of the present disclosure, the cavity 213a may be formed in a lattice structure or a stripe type, and a structure of the cavity 213a is not limited thereto. According to some embodiments of the present disclosure, in a state where the first portion 213 and the second portion 214 are alternately arranged, a cavity may be formed in the first portion 213, and the second portion 214 may extend to a cavity 213a of the first portion 213. For example, the cavity 213a may be formed in a first surface or a second surface of the first portion 213, and according to some embodiments of the present disclosure, may be formed in all of the first surface and the second surface of the first portion 213. The cavity 213a may be formed in a surface opposite to a display panel 100 among surfaces of the first portion 213 and may perform sensing on an object on the display panel 100, and thus, based thereon, may be applied to fingerprint recognition or image sensing.

To perform ultrasound oscillation and reception, the second piezoelectric composite layer PCL2 may be divided into an ultrasound oscillation region PCL2T transmitting or outputting an oscillation and an ultrasound reception region PCL2R receiving the reflected oscillation, and the arrangement of the ultrasound oscillation region PCL2T and the ultrasound reception region PCL2R may be variously adjusted. Therefore, the two regions might by arranged next to each other in the second region 200-2 and may have the same area, but they might be arranged also alternating and might have different sizes.

The ultrasound oscillation region PCL2T may generate an ultrasound based on a vibration generated with a voltage applied to the first and second electrodes 220 and 230, and the ultrasound reception region PCL2R may receive a reflection signal generated from an ultrasound which is generated from the ultrasound oscillation region PCL2T and reflected from an object (for example, a finger).

As illustrated in FIG. 10, all of a partial region of the second piezoelectric composite layer PCL2 may be the ultrasound oscillation region PCL2T, and all of the other partial region of the second piezoelectric composite layer PCL2 may be the ultrasound reception region PCL2R. According to some embodiments of the present disclosure, the ultrasound oscillation region PCL2T and the ultrasound reception region PCL2R may be alternately arranged, and thus, the second piezoelectric composite layer PCL2 may be implemented.

A depth of a first cavity 213a-1 formed in the ultrasound oscillation region PCL2T and a depth of a second cavity 213a-2 formed in the ultrasound reception region PCL2R may be implemented based on a characteristic of the first portion 213 and a characteristic of the second portion 214. For example, the depth of the first cavity 213a-1 and the depth of the second cavity 213a-2 may be adjusted to a depth which enables a frequency generated and received by the second piezoelectric composite layer PCL2 to resonate. Here, the depth of the first cavity 213a-1 and the depth of the second cavity 213a-2 may be similar, however, the depths may be also differ from each other.

For example, in the ultrasound oscillation region PCL2T, the first cavity 213a-1 formed in the first portion 213 of the second piezoelectric composite layer PCL2 may be implemented to have a depth based on a quarter wavelength "$\lambda/4$" of a corresponding frequency in a medium of the first portion 213. For example, in the ultrasound reception region PCL2R, the second cavity 213a-2 formed in the first portion 213 of the second piezoelectric composite layer PCL2 may be implemented to have a depth based on a quarter wavelength "$\lambda/4$" of a corresponding frequency in a medium of the second portion 214. A vibration frequency "f" may be expressed as an equation "$f = v/4L$". Here, the vibration frequency "f" may be an oscillation frequency (Hz), v may be a velocity (m/s) in a medium, and L may be a depth (μm).

For example, in a case where the second piezoelectric composite layer PCL2 is implemented to have a thickness of about 150 μm to about 500 μm and to generate and receive an ultrasound of about 10 MHz, the first portion 213 includes PZT, and the second portion 214 includes PVDF, a movement velocity of a wave in PZT of the first portion 213 may be about 4,500 m/s and a movement velocity of a wave in PVDF of the second portion 214 may be about 2,600 m/s, and thus, based on an equation, the first cavity 213a-1 of the ultrasound oscillation region PCL2T may be formed to have a depth of about 113 µm and the second cavity 213a-2 of the ultrasound reception region PCL2R may be formed to have a depth of about 65 µm. Embodiments of the present disclosure are not limited thereto.

For example, the first cavity 213a-1 may be formed to have a depth for increasing the ultrasound oscillation intensity of the ultrasound oscillation region PCL2T, and the second cavity 213a-2 may be formed to have a depth for increasing the ultrasound reception sensitivity of the ultrasound reception region PCL2R.

Depths of the first and second cavities 213a-1 and 213a-2, as illustrated in FIG. 12, may be the same based on a frequency which is to be implemented. As another example, as illustrated in FIG. 13, the depths of the first and second cavities 213a-1 and 213a-2 may differ. According to some embodiments of the present disclosure, depths of the first cavity 213a-1 formed in the ultrasound oscillation region PCL2T may be the same or differ. According to some embodiments of the present disclosure, depths of the second cavity 213a-2 formed in the ultrasound reception region PCL2R may be the same or differ. For example, the depths of the first cavities 213a-1 formed in the ultrasound oscillation region PCL2T are deeper than the depths of the second cavities 213a-2 formed in the ultrasound reception region PCL2R.

The vibration generating device according to an embodiment of the present disclosure may be applied as a vibration generating device provided in a display apparatus. The display apparatus according to an embodiment of the present disclosure may be applied to mobile apparatuses, video phones, smart watches, watch phones, wearable devices, foldable apparatuses, rollable apparatuses, bendable apparatuses, flexible apparatuses, curved apparatuses, portable multimedia players (PMPs), personal digital assistants (PDAs), electronic organizers, desktop personal computers (PCs), laptop PCs, netbook computers, workstations, navigation apparatuses, automotive navigation apparatuses, automotive display apparatuses, TVs, wall paper display apparatuses, signage apparatuses, game machines, notebook computers, monitors, cameras, camcorders, home appliances, etc. Also, the vibration generating device according to an embodiment of the present disclosure may be applied to organic light emitting lighting apparatuses or inorganic light emitting lighting apparatuses. When the vibration generating device or a sound generating device is applied to a lighting device, the vibration generating device or the sound generating device may act as lighting and a speaker.

A vibration generating device and a display apparatus according to an embodiment of the present disclosure will be described below.

According to an embodiment of the present disclosure, a vibration generating device may comprise a piezoelectric structure including a first region and a second region, the first region may have a vibration characteristic of a first frequency, and the second region may have a vibration characteristic of a second frequency which differs from the first frequency.

According to some embodiments of the present disclosure, the first region and the second region may be parallel to each other.

According to some embodiments of the present disclosure, the first frequency may be lower than the second frequency.

According to some embodiments of the present disclosure, the second frequency may be within a range of 10 MHz to 30 MHz.

According to some embodiments of the present disclosure, the first frequency may be within a range of 10 kHz to 20 kHz.

According to some embodiments of the present disclosure, the second region may comprise an ultrasound oscillation region and an ultrasound reception region.

According to some embodiments of the present disclosure, the first region and the second region may have different vibration modes.

According to some embodiments of the present disclosure, the first region and the second region may be disposed on the same plane and/or be connected at side surfaces thereof.

According to some embodiments of the present disclosure, the first region may be configured as one or more of a haptic actuator, a speaker actuator, and a receiver actuator, and the second region may be configured as a sensing actuator.

According to some embodiments of the present disclosure, the second region may be surrounded by the first region.

According to some embodiments of the present disclosure, the piezoelectric structure may comprise a plurality of second regions disposed spaced apart from one another in the first region, and two or more side surfaces of each of the plurality of second regions may be connected to a side surface of the first region.

According to some embodiments of the present disclosure, the first region may comprise a 2-2 composite having a piezoelectric characteristic of a 2-2 vibration mode, and the second region may comprise a 1-3 composite having a piezoelectric characteristic of a 1-3 vibration mode.

According to some embodiments of the present disclosure, each of the first region and the second region may comprise a plurality of first portions having a piezoelectric characteristic, and a second portion disposed between the plurality of first portions.

According to some embodiments of the present disclosure, each of the plurality of first portions may be an inorganic material portion, and the second portion may be an organic material portion.

According to some embodiments of the present disclosure, the second region and the first region may have different Young's modulus.

According to some embodiments of the present disclosure, Young's modulus of the second portion of the second region may be lower than Young's modulus of the second portion of the first region.

According to some embodiments of the present disclosure, the vibration generating device may further comprise a first electrode disposed on a first surface of the piezoelectric structure and a second electrode disposed on a second surface of the piezoelectric structure opposite to the first surface of the piezoelectric structure, one of the first electrode and the second electrode may comprise a first sub-electrode and a second sub-electrode, the first electrode may be disposed in the first region and the second electrode may be disposed in the second region, and the other electrode of the first electrode and the second electrode may be disposed in the first region and the second region in common.

According to some embodiments of the present disclosure, the vibration generating device may further comprise a first electrode disposed on a first surface of the piezoelectric structure and a second electrode disposed on a second surface of the piezoelectric structure opposite to the first surface of the piezoelectric structure, at least one of the first electrode and the second electrode may comprise a first sub-electrode disposed to correspond to the first region and at least one second sub-electrode disposed to correspond to the first portion of the second region, and the other electrode of the first electrode and the second electrode may be disposed to correspond to the piezoelectric structure.

According to some embodiments of the present disclosure, a width the first portion of the first region may be less than a width of the first portion of the second region.

According to some embodiments of the present disclosure, the first portion of the second region may comprise one or more cavities, and the second portion of the second region may be disposed in the one or more cavities.

According to some embodiments of the present disclosure, the second region may comprise an ultrasound oscillation region and an ultrasound reception region, one or more cavities of the first portion disposed in the ultrasound oscillation region may have a first depth based on a quarter wavelength "λ/4" of a corresponding frequency in a medium of the first portion, and one or more cavities of the first portion disposed in the ultrasound reception region may have a second depth based on a quarter wavelength "λ/4" of a corresponding frequency in a medium of the second portion.

According to some embodiments of the present disclosure, the second region may comprise an ultrasound oscillation region and an ultrasound reception region, and one or more cavities of the first portion disposed in the ultrasound oscillation region may have a first depth from a first surface, and one or more cavities of the first portion disposed in the ultrasound reception region may have a second depth being the same or different from the first depth.

According to some embodiments of the present disclosure, the second region may comprise an ultrasound oscillation region and an ultrasound reception region, the first portion of the second region may comprise a plurality of cavities disposed in the first surface, the second portion of the second region may be disposed in the plurality of cavities, the plurality of cavities of the first portion disposed in the ultrasound oscillation region may have the same first depth or different first depths from a first surface, and the plurality of cavities of the first portion disposed in the ultrasound reception region may have the same second depth or different second depths.

According to an embodiment of the present disclosure, a vibration generating device may comprise a first region having a first vibration characteristic and configured to operate in a first vibration mode, and a second region having a second vibration characteristic and configured to operate in a second vibration mode, the first region and the second region may comprise insulating materials having different Young's modulus According to some embodiments of the present disclosure, the vibration generating device may further comprise a piezoelectric structure including the first region and the second region, each of the first region and the second region may comprise a plurality of first portions having a piezoelectric characteristic, and a second portion disposed between the plurality of first portions, the second portion including an insulating material, and Young's modulus of the second portion of the second region may be lower than Young's modulus of the second portion of the first region.

According to some embodiments of the present disclosure, the vibration generating device may further comprise a first electrode disposed on a first surface of each of the first and second regions, and a second electrode disposed on a second surface of each of the first and second regions, the second electrode of the first region and the second electrode of the second region may be configured as one electrode.

According to some embodiments of the present disclosure, the first electrode of the first region may be spaced apart from the first electrode of the second region.

According to some embodiments of the present disclosure, the first electrode of the second region may be disposed to correspond to the first portion of the second region.

According to some embodiments of the present disclosure, the first region may be configured to operate as one or more actuators of a haptic actuator, a speaker actuator, and a receiver actuator, and the second region may be configured to operate as a sensing actuator.

According to some embodiments of the present disclosure, the second region may be provided in plurality, and the plurality of second regions may be spaced apart from one another in the first region.

According to some embodiments of the present disclosure, the first region and the second region may be disposed in parallel on the same plane.

According to some embodiments of the present disclosure, the second region may comprise an ultrasound oscillation region and an ultrasound reception region.

According to some embodiments of the present disclosure, the first portion of the second region may comprise one or more cavities, and the second portion of the second region may be disposed in the one or more cavities.

According to some embodiments of the present disclosure, the second region may comprise an ultrasound oscillation region and an ultrasound reception region, and one or more cavities of the first portion disposed in the ultrasound oscillation region may have a first depth from a first surface, and one or more cavities of the first portion disposed in the ultrasound reception region may have a second depth being the same or different from the first depth.

According to some embodiments of the present disclosure, the second region may comprise an ultrasound oscillation region and an ultrasound reception region, the first portion of the second region may comprise a plurality of cavities disposed in the first surface, the second portion of the second region may be disposed in the plurality of cavities, the plurality of cavities of the first portion disposed in the ultrasound oscillation region may have the same first depth or different first depths from a first surface, and the plurality of cavities of the first portion disposed in the ultrasound reception region may have the same second depth or different second depths from the first surface.

According to an embodiment of the present disclosure, a vibration generating device may comprise a piezoelectric structure including a first region and a second region, the first region and the second region may be individually driven for different functions, and the second region is driven for image sensing.

According to an embodiment of the present disclosure, the second region may comprise an ultrasound oscillation region for ultrasound oscillation and an ultrasound reception region for receiving a reflected ultrasound.

According to an embodiment of the present disclosure, a display apparatus may comprise a display panel displaying an image, and a vibration generating device disposed on a rear surface of the display panel to vibrate the display panel, the vibration generating device may include a piezoelectric structure including a first region and a second region, the first region may have a vibration characteristic of a first frequency, and the second region may have a vibration characteristic of a second frequency which differs from the first frequency.

According to an embodiment of the present disclosure, a display apparatus may comprise a display panel displaying an image and a vibration generating device disposed on a rear surface of the display panel to vibrate the display panel, the vibration generating device may include a first region having a first vibration characteristic and operating in a first vibration mode and a second region having a second vibration characteristic and operating in a second vibration mode, and the first region and the second region may include insulating materials having different Young's modulus.

According to some embodiments of the present disclosure, the vibration generating device may be attached on the rear surface of the display panel by an adhesive member.

According to some embodiments of the present disclosure, the adhesive member may include a hollow portion between the display panel and the vibration generating device.

According to an embodiment of the present disclosure, an apparatus may comprise a vibration plate, and a vibration generating device disposed on a rear surface of the vibration plate to vibrate the vibration plate, the vibration generating device may include a piezoelectric structure including a first region and a second region, the first region may have a vibration characteristic of a first frequency, and the second region may have a vibration characteristic of a second frequency which differs from the first frequency.

According to an embodiment of the present disclosure, an apparatus may comprise a vibration plate and a vibration generating device disposed on a rear surface of the vibration plate to vibrate the vibration plate, the vibration generating device may include a first region having a first vibration characteristic and operating in a first vibration mode and a second region having a second vibration characteristic and operating in a second vibration mode, and the first region and the second region may include insulating materials having different Young's modulus.

A vibration generating device according to some embodiments of the present disclosure may implement a haptic function, a speaker function, a receiver function, and an image sensing function by using one vibration generating device.

A vibration generating device according to some embodiments of the present disclosure may be implemented as a film type, thereby providing a vibration generating device which has an ultra-thin film type and is easy to change a position at which the vibration generating device is installed.

A vibration generating device according to some embodiments of the present disclosure may include a polymer insulation layer and a piezoelectric element, thereby providing a vibration generating device having excellent flexibility.

A display apparatus according to some embodiments of the present disclosure may be implemented to vibrate a display panel by using a vibration generating device, and thus, may generate a sound so that a traveling direction of a sound of the display apparatus is a forward direction of the display panel.

A display apparatus according to some embodiments of the present disclosure may include one vibration generating device for implementing a haptic function, a speaker function, a receiver function, and an image sensing function, thereby providing a display apparatus where a speaker, a haptic element, a receiver, and an image sensor are implemented as one vibration generating device.

It will be apparent to those skilled in the art that various modifications and variations may be made in the present disclosure without departing from the technical idea or scope of the disclosures. Thus, it may be intended that embodiments of the present disclosure cover the modifications and variations of the disclosure provided they come within the scope of the appended claims and their equivalents.

What is claimed is:

1. A vibration generating device, comprising:
 a piezoelectric structure including a first region and a second region,
 wherein:
 the first region has a vibration characteristic of a first frequency;
 the second region has a vibration characteristic of a second frequency which differs from the first frequency;
 a lateral surface of the first region is directly coupled to a lateral surface of the second region without a coupling medium;
 the first region and the second region have a same thickness;
 the first region is configured as one or more of a haptic actuator, a speaker actuator, and a receiver actuator;
 the second region is configured as a sensing actuator or a fingerprint sensing actuator;
 each of the first region and the second region comprises a plurality of first portions having a piezoelectric characteristic, and a second portion disposed between the plurality of first portions; and
 a width of the first portion of the second region is less than a width of the first portion of the first region.

2. The vibration generating device of claim 1, wherein the first region and the second region are parallel to each other.

3. The vibration generating device of claim 1, wherein the first frequency is lower than the second frequency.

4. The vibration generating device of claim 3, wherein the second frequency is within a range of 10 MHz to 30 MHz.

5. The vibration generating device of claim 3, wherein the first frequency is within a range of 10 kHz to 20 kHz.

6. The vibration generating device of claim 3, wherein the second region comprises an ultrasound oscillation region and an ultrasound reception region.

7. The vibration generating device of claim 1, wherein the first region and the second region have different vibration modes.

8. The vibration generating device of claim 1, wherein the first region and the second region are disposed on a same plane or are connected at lateral surfaces thereof.

9. The vibration generating device of claim 1, wherein the second region is surrounded by the first region.

10. The vibration generating device of claim 1, wherein:
 the piezoelectric structure comprises a plurality of second regions spaced apart from one another in the first region; and
 two or more lateral surfaces of each of the plurality of second regions are connected to a lateral surface of the first region.

11. The vibration generating device of claim 1, wherein:
 the first region comprises a 2-2 composite having a piezoelectric characteristic of a 2-2 vibration mode; and
 the second region comprises a 1-3 composite having a piezoelectric characteristic of a 1-3 vibration mode.

12. The vibration generating device of claim 1, wherein:
each of the plurality of first portions includes an inorganic material portion; and
the second portion includes an organic material portion.

13. The vibration generating device of claim 1, wherein the second region and the first region have different Young's modulus.

14. The vibration generating device of claim 13, wherein Young's modulus of the second portion of the second region is lower than Young's modulus of the second portion of the first region.

15. The vibration generating device of claim 1, wherein a lateral surface of the second region is directly connected to a lateral surface of one or more of the plurality of first portions and the second portion disposed in the first region.

16. The vibration generating device of claim 1, further comprising a first electrode disposed on a first surface of the piezoelectric structure and a second electrode disposed on a second surface of the piezoelectric structure opposite to the first surface of the piezoelectric structure,
wherein:
at least one of the first electrode and the second electrode comprises a first sub-electrode and a second sub-electrode, and the first electrode is disposed in the first region and the second electrode is disposed in the second region; and
the other electrode of the first electrode and the second electrode is disposed in the first region and the second region in common.

17. The vibration generating device of claim 1, further comprising a first electrode disposed on a first surface of the piezoelectric structure and a second electrode disposed on a second surface of the piezoelectric structure opposite to the first surface of the piezoelectric structure,
wherein:
at least one of the first electrode and the second electrode comprises a first sub-electrode disposed to correspond to the first region and at least one second sub-electrode disposed to correspond to the first portion of the second region; and
the other electrode of the first electrode and the second electrode is disposed to correspond to the piezoelectric structure.

18. The vibration generating device of claim 1, wherein:
the first portion of the second region comprises one or more cavities; and
the second portion of the second region is disposed in the one or more cavities.

19. The vibration generating device of claim 18, wherein:
the second region comprises an ultrasound oscillation region and an ultrasound reception region;
one or more cavities of the first portion disposed in the ultrasound oscillation region have a first depth based on a quarter wavelength "λ/4" of a corresponding frequency in a medium of the first portion; and
one or more cavities of the first portion disposed in the ultrasound reception region have a second depth based on a quarter wavelength "λ/4" of a corresponding frequency in a medium of the second portion.

20. The vibration generating device of claim 18, wherein:
the second region comprises an ultrasound oscillation region and an ultrasound reception region; and
one or more cavities of the first portion disposed in the ultrasound oscillation region have a first depth from a first surface, and one or more cavities of the first portion disposed in the ultrasound reception region have a second depth being same or different from the first depth.

21. The vibration generating device of claim 1, wherein:
the second region comprises an ultrasound oscillation region and an ultrasound reception region;
the first portion of the second region comprises a plurality of cavities disposed at a first surface;
the second portion of the second region is disposed in the plurality of cavities;
the plurality of cavities of the first portion disposed in the ultrasound oscillation region have a same first depth or different first depths from the first surface; and
the plurality of cavities of the first portion disposed in the ultrasound reception region have a same second depth or different second depths from the first surface.

22. A display apparatus, comprising:
a display panel displaying an image; and
the vibration generating device of claim 1 disposed on a rear surface of the display panel to vibrate the display panel.

23. The display apparatus of claim 22, wherein the vibration generating device is attached on the rear surface of the display panel by an adhesive member.

24. The display apparatus of claim 23, wherein the adhesive member includes a hollow portion between the display panel and the vibration generating device.

25. An apparatus, comprising:
a vibration plate; and
the vibration generating device of claim 1 disposed on a rear surface of the vibration plate to vibrate the vibration plate.

26. A vibration generating device, comprising:
a first region having a first vibration characteristic and configured to operate in a first vibration mode; and
a second region having a second vibration characteristic and configured to operate in a second vibration mode,
wherein the first region and the second region comprise insulating materials having different Young's modulus, and
wherein:
a lateral surface of the first region is directly coupled to a lateral surface of the second region without a coupling medium;
the first region and the second region have a same thickness;
the first region is configured as one or more of a haptic actuator, a speaker actuator, and a receiver actuator;
the second region is configured as a sensing actuator or a fingerprint sensing actuator;
each of the first region and the second region comprises a plurality of first portions having a piezoelectric characteristic, and a second portion disposed between the plurality of first portions; and
a width of the first portion of the second region is less than a width of the first portion of the first region.

27. The vibration generating device of claim 26, further comprising a piezoelectric structure including the first region and the second region,
wherein the second portion includes an insulating material, and
Young's modulus of the second portion of the second region is lower than Young's modulus of the second portion of the first region.

28. The vibration generating device of claim 27, further comprising:

a first electrode disposed on a first surface of each of the first and second regions; and a second electrode disposed on a second surface of each of the first and second regions, wherein the second electrode of the first region and the second electrode of the second region are configured as one electrode.

29. The vibration generating device of claim 28, wherein the first electrode of the first region is spaced apart from the first electrode of the second region.

30. The vibration generating device of claim 28, wherein the first electrode of the second region is disposed to correspond to the first portion of the second region.

31. The vibration generating device of claim 28, wherein:
the second region comprises an ultrasound oscillation region and an ultrasound reception region;
the first portion of the second region comprises a plurality of cavities disposed in the first surface;
the second portion of the second region is disposed in the plurality of cavities;
the plurality of cavities of the first portion disposed in the ultrasound oscillation region have a same first depth or different first depths from the first surface; and
the plurality of cavities of the first portion disposed in the ultrasound reception region have a same second depth or different second depths from the first surface.

32. The vibration generating device of claim 26, wherein the second region is provided in plurality, and the plurality of second regions are spaced apart from one another in the first region.

33. The vibration generating device of claim 26, wherein the first region and the second region are disposed in parallel on a same plane.

34. The vibration generating device of claim 26, wherein the second region comprises an ultrasound oscillation region and an ultrasound reception region.

35. The vibration generating device of claim 34, wherein:
the first portion of the second region comprises one or more cavities; and
the second portion of the second region is disposed in the one or more cavities.

36. The vibration generating device of claim 35, wherein one or more cavities of the first portion disposed in the ultrasound oscillation region have a first depth from a first surface, and one or more cavities of the first portion disposed in the ultrasound reception region have a second depth being same or different from the first depth.

37. The vibration generating device of claim 26, further comprising a piezoelectric structure including the first region and the second region,
wherein a lateral surface of the second region is directly connected to a lateral surface of one or more of the plurality of first portions and the second portion disposed in the first region.

38. A display apparatus, comprising:
a display panel displaying an image; and
the vibration generating device of claim 26 disposed on a rear surface of the display panel to vibrate the display panel.

39. An apparatus, comprising:
a vibration plate; and
the vibration generating device of claim 26 disposed on a rear surface of the vibration plate to vibrate the vibration plate.

40. A vibration generating device, comprising:
a piezoelectric structure including a first region and a second region,
wherein:
the first region and the second region are individually driven for different functions, and the second region is driven for image sensing;
a lateral surface of the first region is directly coupled to a lateral surface of the second region without a coupling medium;
the first region and the second region have a same thickness;
the first region is configured as one or more of a haptic actuator, a speaker actuator, and a receiver actuator; and
the second region is configured as a sensing actuator or a fingerprint sensing actuator;
each of the first region and the second region comprises a plurality of first portions having a piezoelectric characteristic, and a second portion disposed between the plurality of first portions; and
a width of the first portion of the second region is less than a width of the first portion of the first region.

41. The vibration generating device of claim 40, wherein the second region comprises an ultrasound oscillation region for ultrasound oscillation and an ultrasound reception region for receiving a reflected ultrasound.

* * * * *